(12) United States Patent
Russell-Clarke et al.

(10) Patent No.: US 11,033,984 B2
(45) Date of Patent: Jun. 15, 2021

(54) LASER-FORMED FEATURES

(71) Applicant: Apple Inc., Cupertino, CA (US)

(72) Inventors: Peter N. Russell-Clarke, San Francisco, CA (US); Michael S. Nashner, San Jose, CA (US); Houtan R. Farahani, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 104 days.

(21) Appl. No.: 16/412,125

(22) Filed: May 14, 2019

(65) Prior Publication Data
US 2019/0262948 A1 Aug. 29, 2019

Related U.S. Application Data

(63) Continuation of application No. 14/298,499, filed on Jun. 6, 2014, now Pat. No. 10,328,527.
(Continued)

(51) Int. Cl.
*B32B 3/26* (2006.01)
*B23K 26/352* (2014.01)
(Continued)

(52) U.S. Cl.
CPC ........ *B23K 26/352* (2015.10); *B23K 26/0622* (2015.10); *B23K 26/355* (2018.08);
(Continued)

(58) Field of Classification Search
CPC ............ B23K 26/0066; B23K 26/0081; B23K 26/0084; B23K 26/0087; B23K 26/351;
(Continued)

(56) References Cited

U.S. PATENT DOCUMENTS 296,631 A * 4/1884 Schuetz
1,608,108 A 11/1926 Martus et al.
(Continued)

FOREIGN PATENT DOCUMENTS

CH 689338 * 2/1999
CH 714005 * 1/2019
(Continued)

OTHER PUBLICATIONS

Jaeger, "Color Solid Ink Printing," imaging.org, 4 pages, at least as early as Sep. 23, 2014.
(Continued)

*Primary Examiner* — Megha M Gaitonde
(74) *Attorney, Agent, or Firm* — Brownstein Hyatt Farber Schreck, LLP

(57) ABSTRACT

Embodiments are directed to laser-based processes for forming features on the surface of a part. The feature may include a geometric element, a color element, and/or a surface finish element. In some cases, the laser-formed features are formed as a pattern of textured features that produce an aesthetic and/or tactile effect on the surface of the part. In some cases, the texture features may be sufficiently small that they may not be discerned by the unaided human eye. Also, in some cases, a multiple laser-based processes are combined to form a single feature or a finished part having a specific aesthetic and/or tactile effect.

20 Claims, 17 Drawing Sheets

Related U.S. Application Data

(60) Provisional application No. 61/832,885, filed on Jun. 9, 2013, provisional application No. 61/833,050, filed on Jun. 10, 2013.

(51) Int. Cl.
| | | |
|---|---|---|
| *B44C 1/00* | (2006.01) | |
| *B44C 1/10* | (2006.01) | |
| *B23K 26/0622* | (2014.01) | |
| *B23K 26/361* | (2014.01) | |
| *B44C 1/22* | (2006.01) | |
| *B41M 5/24* | (2006.01) | |
| *B41M 5/26* | (2006.01) | |
| *B23K 101/36* | (2006.01) | |

(52) U.S. Cl.
CPC .......... *B23K 26/361* (2015.10); *B32B 3/263* (2013.01); *B44C 1/005* (2013.01); *B44C 1/105* (2013.01); *B44C 1/228* (2013.01); *B23K 2101/36* (2018.08); *B41M 5/24* (2013.01); *B41M 5/26* (2013.01); *Y10T 428/219* (2015.01); *Y10T 428/24479* (2015.01)

(58) Field of Classification Search
CPC .... B23K 26/352; B23K 26/359; B23K 26/36; B23K 26/362; B23K 26/364; Y10T 428/24479; Y10T 428/2457; Y10T 428/24942; Y10T 428/2495; G04B 3/041
USPC ....... 428/156, 157, 163, 164, 167, 212, 213; 368/49–51, 145, 147, 190–199, 216, 368/288–290, 306–308, 319–321
See application file for complete search history.

(56) References Cited

U.S. PATENT DOCUMENTS

| | | | |
|---|---|---|---|
| 2,473,848 A | 8/1947 | Baxter | |
| 2,821,589 A | 1/1958 | Needham | |
| 3,123,792 A | 3/1964 | Klemm | |
| 3,471,663 A | 10/1969 | Farrell | |
| 3,499,281 A | 3/1970 | Denley | |
| 3,535,869 A | 10/1970 | Strigini | |
| 3,982,917 A | 9/1976 | Upton | |
| 4,227,059 A | 10/1980 | Ogawa | |
| 4,340,791 A | 7/1982 | Sorenson | |
| 4,598,035 A | 7/1986 | Usami et al. | |
| 4,861,620 A | 8/1989 | Azuma et al. | |
| 5,180,051 A | 1/1993 | Cook et al. | |
| 5,206,496 A | 4/1993 | Clement et al. | |
| 5,214,530 A | 5/1993 | Coombs et al. | |
| 5,215,864 A | 6/1993 | Laakmann | |
| 5,327,201 A | 7/1994 | Coleman et al. | |
| 5,496,977 A | 3/1996 | Date et al. | |
| 5,523,125 A | 4/1996 | Kennedy et al. | |
| 5,607,607 A | 3/1997 | Naiman et al. | |
| 5,718,326 A | 2/1998 | Larose et al. | |
| 5,936,213 A | 8/1999 | Bisquez et al. | |
| 6,040,543 A | 3/2000 | Mina et al. | |
| 6,084,190 A | 7/2000 | Kenmochi | |
| 6,126,309 A * | 10/2000 | Bettelini ........... G04B 27/00 368/185 | |
| 6,196,738 B1 | 3/2001 | Shimizu et al. | |
| 6,201,196 B1 | 3/2001 | Wergen | |
| 6,392,683 B1 | 5/2002 | Hayashi | |
| 6,565,770 B1 | 5/2003 | Mayer et al. | |
| 6,591,457 B1 | 7/2003 | Howie, Jr. | |
| 6,630,635 B1 | 10/2003 | Doepner | |
| 6,667,450 B2 | 12/2003 | Bulin et al. | |
| 6,670,571 B2 | 12/2003 | Dance | |
| 6,707,358 B1 | 3/2004 | Massman | |
| 6,734,389 B2 | 5/2004 | Troitski | |
| 6,762,381 B2 | 7/2004 | Kunthady et al. | |
| 7,060,933 B2 | 6/2006 | Burrowes et al. | |
| 7,101,603 B2 | 9/2006 | Okamura et al. | |
| 7,165,846 B2 | 1/2007 | Shinya | |
| 7,297,221 B2 | 11/2007 | Hikita | |
| 7,414,213 B2 | 8/2008 | Hwang et al. | |
| 7,531,765 B2 | 5/2009 | Komagata | |
| 7,727,618 B2 | 6/2010 | Iwano | |
| 8,003,200 B2 | 8/2011 | Nashiki et al. | |
| 8,173,253 B2 | 5/2012 | Green et al. | |
| 8,198,626 B2 | 6/2012 | Lee et al. | |
| 8,222,773 B2 | 7/2012 | De Iuliis et al. | |
| 8,232,502 B2 | 7/2012 | Young et al. | |
| 8,451,873 B2 | 5/2013 | Zhang | |
| 8,529,775 B2 | 9/2013 | Costin et al. | |
| 8,640,413 B2 | 2/2014 | Ruggie et al. | |
| 8,802,220 B2 | 8/2014 | Cao et al. | |
| 8,859,920 B2 | 10/2014 | Manullang et al. | |
| 8,859,923 B2 | 10/2014 | Obata et al. | |
| 8,867,320 B2 | 10/2014 | Suzuki et al. | |
| 8,882,280 B2 | 11/2014 | Fukaya et al. | |
| 9,335,868 B2 | 5/2016 | Hotelling et al. | |
| 9,600,694 B1 | 3/2017 | Memering et al. | |
| 9,629,271 B1 | 4/2017 | Lancaster-Larocque et al. | |
| 9,678,258 B2 | 6/2017 | Hankey et al. | |
| 9,727,178 B2 | 8/2017 | Matsuyuki et al. | |
| 9,790,126 B2 | 10/2017 | Matsuyuki et al. | |
| 9,844,898 B2 | 12/2017 | Hill et al. | |
| 9,916,048 B2 | 3/2018 | Ishibashi et al. | |
| 10,099,506 B2 | 10/2018 | Walker et al. | |
| 2005/0287301 A1 | 12/2005 | Ljubomirsky | |
| 2006/0024476 A1 | 2/2006 | Leland et al. | |
| 2007/0054067 A1 | 3/2007 | Power | |
| 2007/0276504 A1 | 11/2007 | Sparer et al. | |
| 2008/0042427 A1 | 2/2008 | Muke | |
| 2008/0299408 A1 | 12/2008 | Guo et al. | |
| 2008/0304525 A1 | 12/2008 | Kupisiewicz et al. | |
| 2009/0166343 A1 | 7/2009 | Lappalainen et al. | |
| 2009/0237782 A1 | 9/2009 | Takamatsu et al. | |
| 2010/0119808 A1 | 5/2010 | Li et al. | |
| 2011/0109590 A1 | 5/2011 | Park et al. | |
| 2012/0328905 A1 | 12/2012 | Guo et al. | |
| 2013/0075126 A1 | 3/2013 | Nashner et al. | |
| 2013/0112536 A1 | 5/2013 | Shah et al. | |
| 2013/0140746 A1 | 6/2013 | Heverly et al. | |
| 2014/0363608 A1 | 12/2014 | Lancaster-Larocque et al. | |
| 2017/0001906 A1 | 1/2017 | Karagoz et al. | |
| 2017/0008798 A1 | 1/2017 | Mimoun et al. | |
| 2020/0104549 A1 | 4/2020 | Russell-Clarke et al. | |
| 2020/0104550 A1 | 4/2020 | Russell-Clarke et al. | |

FOREIGN PATENT DOCUMENTS

| | | |
|---|---|---|
| CN | 101665969 | 3/2010 |
| CN | 101665971 | 3/2010 |
| CN | 101729624 | 6/2010 |
| CN | 102102465 | 6/2011 |
| CN | 201945987 | 8/2011 |
| CN | 201956238 | 8/2011 |
| CN | 102725663 | 10/2012 |
| CN | 102752982 | 10/2012 |
| CN | 202632259 | 12/2012 |
| CN | 202649955 | 1/2013 |
| CN | 102958640 | 3/2013 |
| CN | 202854790 | 4/2013 |
| CN | 103112308 | 5/2013 |
| CN | 203366304 | 12/2013 |
| CN | 103902122 | 7/2014 |
| CN | 204242152 | 4/2015 |
| DE | 102010006665 | 8/2011 |
| EP | 0424173 | 4/1991 |
| EP | 1805040 | 7/2007 |
| EP | 3330897 | 6/2018 |
| GB | 581824 | 10/1946 |
| GB | 957644 | 5/1964 |
| JP | H0593811 | 4/1993 |
| JP | 05307088 | * 11/1993 |
| JP | 201263839 | 3/2012 |
| JP | 201410814 | 1/2014 |
| KR | 1020090131944 | 4/2010 |
| TW | M414616 | 10/2011 |

(56) References Cited

FOREIGN PATENT DOCUMENTS

| TW | 201231792 | 8/2012 |
|---|---|---|
| WO | WO01/34408 | 5/2001 |
| WO | WO2011/076294 | 6/2011 |
| WO | WO2013/135703 | 9/2013 |
| WO | WO2015/128188 | 9/2015 |

OTHER PUBLICATIONS

International Search Report and Written Opinion, PCT/US2014/041392, 17 pages, dated Feb. 12, 2015.
Invitation to Pay Additional Fees, PCT/US2014/041392, 5 pages, dated Sep. 16, 2014.

* cited by examiner

DETAIL 1

LASER-FORMED FEATURES

CROSS-REFERENCE TO RELATED APPLICATION(S)

This application is a continuation patent application of U.S. patent application Ser. No. 14/298,499, filed Jun. 6, 2014 and titled "Laser-Formed Features," which is a non-provisional patent application of and claims the benefit of U.S. Provisional Patent Application No. 61/832,885, filed Jun. 9, 2013 and titled "Laser Texturing" and U.S. Provisional Patent Application No. 61/833,050, filed Jun. 10, 2013 and titled "Laser Texturing," the disclosures of which are hereby incorporated herein in their entireties.

FIELD

Embodiments described herein relate generally to forming features on a surface, and more specifically to using a laser to form a feature having particular geometric, color, and/or surface finish elements on a surface or within a part.

BACKGROUND

Mechanical cutting, drilling and the like have been used to form patterns or features on surfaces for years. However, these mechanical operations generally have difficulties forming relatively small features, such as those used to provide certain textures, with precision. Likewise, using some mechanical texturing operations it may be difficult to form features sufficiently small that they are visually undetectable but alter the optical property of a surface on which they are formed.

Further, since mechanical operations typically rely on specially-shaped bits, cutters and the like to form texture features, it is difficult, if not impossible, to form only a partial feature next to a full feature without changing out the bit/cutter.

SUMMARY

Some example embodiments are directed to a device having at least one feature formed into a surface of the device. The feature may include a geometric element that is formed into the surface and is formed using a first laser-based process. The feature may also include a color element formed into the geometric element. The color element may be formed using a second laser-based process. In some cases, the feature also includes a surface finish element formed into one of the surface or the geometric element. The surface finish element may be formed using a third laser-based process. In some embodiments, the geometric element is formed using a laser ablation process and the color element is formed using one of a black-marking or white-marking process.

Some example embodiments are directed to a method for forming a feature on a surface of a part. An initial shape may be machined into the surface of the part and the surface of the part may be polished and/or blasted. In some cases, the surface of the part is anodized to form an anodized layer. A texture feature may be formed on the part using a first laser-based process and a color feature may also be formed on the part using a second laser-based process. In some cases, the texture feature is formed on the part after the anodized layer has been formed. In some cases, the color feature is formed on the part after the anodized layer has been formed, and may be formed by focusing a laser beam into the part below the anodized layer.

Some example embodiments are directed to a device with a surface having a pattern of texture features formed into the surface. The surface of the device may include a pattern of full-shape texture features that are formed using a laser. The surface may also include a pattern of partial-shape texture features that are adjacent to the pattern of full-shape features. The partial-shape texture features may also be formed using the laser. In some embodiments, the partial shape texture features have a partial shape that is less than the full-shape texture feature. The surface may also include a non-patterned portion of the surface.

Some example embodiments are directed to a surface having a patterned region and a non-patterned region adjacent the patterned region. In some cases, the patterned region includes a plurality of texture features cooperating to define an inner portion of the patterned region. The patterned region may also include at least one partial texture feature defining a portion of a border between the patterned region and the non-patterned region. The texture features and at least one partial texture feature are formed using a laser. In some cases, the patterned region reflects light differently than the non-patterned region. The plurality of texture features may also be indiscernible to the human eye.

Some example embodiments are directed to a device having a laser-formed feature. The feature may include a circular hub feature that is raised with respect to a surface of the device. The feature may also include an array of rib features arranged around the circular hub feature. Each rib feature may include an arcuate surface that extends from the hub feature to the surface of the device The feature may also include an array of groove features that separate the rib features. In some cases, each groove feature has a back wall that connects to two side walls and the back wall and the two side walls connect at a sharp corner. In some embodiments, the back wall and two side walls are formed using a laser.

One example embodiment is directed to a laser-formed dial. The dial may include a circular hub feature that is offset from a lower portion of the dial. The dial may also include an array of rib features arranged around the circular hub feature. Each rib feature may include an arcuate surface that extends from the hub feature to the lower portion of the device. The dial may also include an array of groove features that separate the rib features. Each groove feature may include a back wall that connects to two side walls. In some cases, the back wall and the two side walls connect at a sharp corner, and the back wall and two side walls are formed using a laser.

Another example embodiment is directed to a method for forming a texture feature on a surface. Using a laser, a pattern of full-shape texture features may be formed on the surface of the device. A pattern of partial-shape texture features may also be formed on the surface of the device using the laser. The partial-shape texture features may include a partial shape that is less than the full-shape texture feature. The surface may also include a non-patterned portion of the surface.

DETAILED DESCRIPTION

Figure 1A:
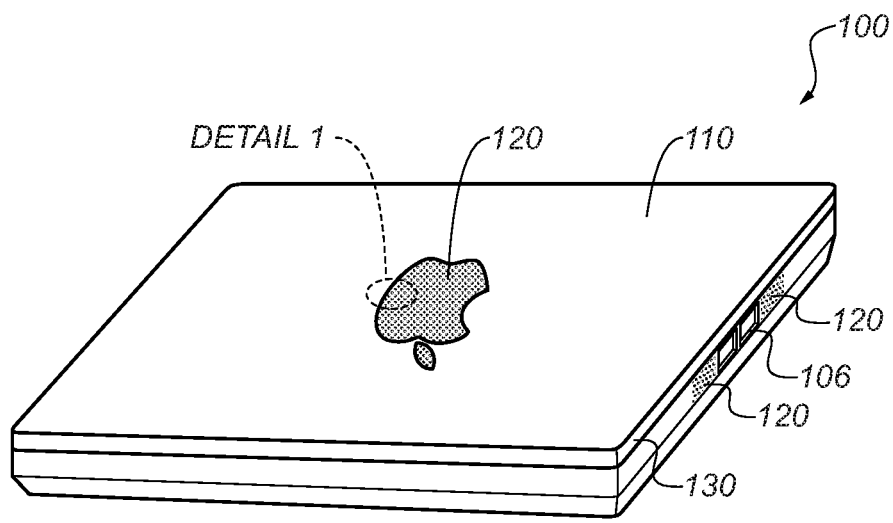
FIGS. 1A-B depict a device having a patterned region and a non-patterned region.

Generally, embodiments described herein may take the form of a feature or features on the surface of a part and/or a method for forming a such a feature(s) on the surface of a part using a laser. The feature(s) may, for example, be formed or applied to the surface of a component of a consumer product. The components may correspond to, but are not limited to, housings, enclosures, buttons, dials, bezels, and the like. The consumer products may correspond to, but are not limited to, media players, phones, tablets, laptops, computers, cameras, wearable electronic devices, appliances, and the like.

In some cases, the feature(s) are applied to a surface of the component to enhance its aesthetic effect and/or to improve its tactile feel, finish, and/or cosmetics of the consumer product. By way of example, one or more features may be used to provide a functional grip pattern and/or visual pattern on a surface. In some case, the surface may be an outer surface so as to be accessible to and visible by the consumer. In some cases, the one or more features may be used to ornament at least a portion (if not all) of the exterior surfaces of the consumer product.

The feature(s) may include one or more characteristics or elements that are used to produce the desired cosmetic and/or tactile effect. The features may, for example, include geometric elements, color elements, and/or surface finish elements. The feature(s) may be formed using a laser-based process (e.g., laser-formed features). By way of example, geometric elements may be formed as recesses, protrusions, holes, or other geometric forms relative to a surface. This may, for example, be accomplished via a first laser-based process (etching, ablating, engraving, etc.) In some cases, the geometric elements may be formed to contrast with the existing surface or other features formed within the surface (e.g., appearance and/or textural contrast). In some cases, color elements may be formed to correspond with or to enhance the geometric elements. The color elements may, for example, be formed using another laser-based process. The color may produce a contrasting colored appearance (e.g., black, white, dark, light). In some cases, the color elements may work together with the geometric elements to create a contrasting effect with the existing surface. Alternatively or additionally, finish elements may be formed to contrast with the existing surface or other features formed within the surface. The finish elements may be formed via another laser-based process. Finish elements of the feature may, for example, correspond to or be associated with other elements (e.g., geometric, color) to produce different results relative to a surface (e.g., polished, matte). In some cases, the finish elements contrast with the existing surface or surface finish. Each of these elements (e.g., geometric, color, finish) can be used solely or together to create a particular feature. In addition, other processes or surface enhancements may be used to further enhance the aesthetic and tactile effects (e.g., machining, blasting, anodization).

By way of example, and not limitation, the feature may only include a geometric element such as a recess within a surface. Alternatively, the feature may be formed as a combination of a geometric element with a color element or a finish element such as a recess with a black color applied to some portion of the recess and/or surface surrounding the recess (or a recess with a polish finish applied to some portion of the recess and/or surface surrounding the recess). In yet another alternative, the feature may be a combination of a geometric element with a color element and a finish element such as a recess with a black color applied to some portion of the recess and/or surface surrounding the recess, and a polished finish applied to some portion of the recess and/or surface surrounding the recess. Any combination of these elements as well as their positions relative to one another can be made to produce the desired cosmetic and/or tactile effect. Furthermore, the elements may be formed using a laser. For example, the geometric element may be formed via a first laser process. The color element may be formed via a second laser process. The finish element may be formed via a third laser process. The processes may be performed different laser parameters using same or different laser systems.

Furthermore, the attributes of these elements can be adjusted to further enhance the desired aesthetic effect. For example, with regards to geometric elements, the shape and dimensions may be varied. For example, the geometric elements may have a rectilinear or curvilinear shape and further a specific shape such as rectangle, square, circle, oval, triangle, etc. Furthermore, they may be short/tall (protrusion) or shallow/deep (recess). In addition, with regards to color and finish elements, like the geometric elements, the shape and dimension may be varied along with the hue, value, and intensity of the color and/or the reflectivity and roughness of the finish may be varied to achieve the desired effect.

Additionally, a feature may have one type of element (geometric, color, finish) or many types of elements, all formed using a laser. In one example, the feature may be formed as a combination of a recess, a black color applied to some portion of the recess and/or surface surrounding the recess and a polished area applied to some portion of the recess and/or surface surrounding the recess. In some cases, the recess geometry may have a circular x shape, circular y shape and a specific z dimension or depth. The feature may also have a black color formed as a black crescent shape with a varying shade of black on one side of the recess.

Additionally, the feature may also have a polished area may be formed as a circular shape on the bottom and edges of the recess. As should be appreciated, the various elements and attributes of those elements can be selected to create the desired aesthetic and tactile effect. For example, the geometric element may provide the base around which the color and/or finish elements may be used to create highlights to enhance the effects.

In one embodiment, multiple features can be used to create a unique pattern across a portion of or across an entire surface. The pattern may be a random or repeating pattern or a combination thereof (i.e., some portion random, some portion repeating). In some cases, a repeating pattern includes multiple features that are arranged in an array or fixed spacing and/or pitch locations. In some cases, the features may vary within the pattern. For example, the features may vary in shape, size, and depth within the pattern. The color and finish elements may also vary from feature to feature, in some cases. Additionally or alternatively, the spacing and/or pitch locations of the features may vary within the pattern. In some cases, one or more aspects of the features and/or the pattern may vary or be random. The pattern of features (repeating and/or random) may include features that are recessed into the surface, raised above the surface, or a combination of both. A specific example of repeating features and random or varying features are described below with respect to FIGS. 11A-B.

In some embodiments, the features can be formed over shaped parts with complex geometries including rectilinear and curvilinear geometries. In addition, the features may be applied to complex three-dimensional (3D) surfaces, such as splines. Furthermore, the features may be applied over transitions from one surface geometry to another (e.g., flat surface to contoured surface, contoured surface to flat surface, two-dimensional surface to three-dimensional surface, and three-dimensional surface to another three-dimensional surface). In one example implementation, the elements of the features remain constant over the complex geometries. The features may also be formed as a pattern over a variety of surfaces including surfaces that are flat (e.g., planar), contoured, or any other suitable two-dimensional or three-dimensional surface.

Any of a number of features may be inscribed or otherwise patterned on a surface. In some embodiments, a single geometric element (or texture feature) may be formed at repeating intervals to form a pattern feature. In some cases, the geometry of texture features in the pattern may be characterized as having full or as partial shapes. For example, one texture feature may be formed from geometric element including a cylindrical hole in a surface and the texture pattern may be formed as a repeating pattern of the cylindrical holes. Another texture feature may be formed from a geometric element including a partial shape, such as half-cylindrical holes. In some cases, the partial-shape textured feature may be formed at the edge or boundary of the first texture feature. This technique may be used when a textured pattern reaches an edge of the surface. In some cases, this provides for a textured surface near or along the edge of a surface without compromising the edge or geometry of the surface. Likewise, if a button, switch, or other element protrudes through the surface, a portion of the pattern may be formed from partially-shaped texture features in a region around the element to define a transition region. This may be preferable to abruptly ending a pattern formed from full-shape texture features or extending the pattern into the element or transition region.

In some embodiments, an individual feature may not be visible or discerned by the unaided human eye. For example, the geometry size, color, or surface finish may make it difficult for the human eye to detect a single feature formed in a surface. However, when the features are formed as a pattern of features over the surface, the collective effect of the pattern of features may interact with light to produce a particular aesthetic effect. In one example, reflected light may give the pattern of features a different appearance than a non-patterned portion of the surface. (As explained in more detail below, the "non-patterned portion of the surface" refers only to the part of the surface on which the pattern of features is not formed; other patterns, surface treatments, and the like may be formed thereon.) In some cases, the pattern of features may additionally or alternatively produce a tactile effect that may be distinct from a non-patterned portion of the surface.

Further, a feature may be formed into the surface to impart a particular texture to the surface. For example, one or more features may include be used to enhance grip, friction with a user's finger or other skin, and the like. The feature or pattern may repeat at intervals designed to enhance grip, sensation, friction, engagement and so on; the interval may vary depending on the purpose of the pattern but, in certain embodiments, may generally be less than the width of a fingertip.

As discussed above, the features and more particularly their associated elements may be created using laser based processes (e.g., some or all of the feature may be laser formed). In general, laser-based processes used to form the features and the one or more elements may provide benefits over traditional methods. One benefit may for example include selectivity or control of feature formation from feature to feature. For example, the features may be varied to accommodate changes in surface geometry or to achieve a particular effect. Another example benefit may include the ability to work on complex geometries and/or complex shaped parts. For example, a laser-based process may be very precise and provide the capability to follow a substantially straight line or profile even over complex three-dimensional geometries. Another example benefit may include the ability to accommodate adaptive tolerances from feature to feature. Yet another example benefit may be that a pattern or feature can be formed started anywhere, including the center of the pattern or feature.

Laser-based processes may also facilitate flexibility in the order in which processes are performed. As described in more detail below with respect to FIG. 13, one or more of the laser-based processes may be performed before or after an anodizing or other surface treatment operation. One advantage to forming the features after anodizing is that the color or appearance of the laser-formed feature(s) may be less affected by post-processing. Additionally, a protective anodizing coating may facilitate handling and further processing by reducing the risk of damage. Also as described below with respect to FIG. 13, it may be possible to form a finished part using only or substantially only laser-based processes.

For the purposes of the following description, a laser-based process may include a manufacturing process that uses light produced by a laser (e.g., a laser beam) to alter the properties of the part. In some cases, the laser-based process is configured to alter the surface of the part. In other cases, the laser-based process may be configured to alter the material of the part below the surface. For example, a laser may be focused or directed below an anodized layer to form a sub-surface feature or element. As described in more detail below, lasers-based processes can be used to control geometric, color and/or finish elements of a feature or series of features. The adjacent features can be the same or they can be different depending on how the laser is controlled during a feature-forming process.

In one embodiment, the geometric elements of a feature may be formed using a first laser-based process. In one example, a first set of laser parameters can be used to form a feature's geometric element by ablating material away from a surface. In some cases, the parameters of the laser-based process can be varied to create holes, recesses and/or protrusions. In some cases, the parameters of a laser-based process may be set to create features having sharp internal corners that would be difficult or impossible to achieve using traditional machining operations. In one particular example provided below with respect to FIGS. 7A-D, a laser is used to form a dial having fine features that may enhance grip and also assist in determining the orientation of the dial.

In some cases, a second laser-based process may be configured to form a color element of the feature or change the color or appearance of a surface of a part. For example, using the same or a different type of laser, a second set of laser parameters may be configured to lighten or darken the surface of a part. In one specific example, a laser-based process is configured to oxidize a region of the surface to darken or lighten that region and create a colored feature.

In some cases, a third laser-based process may be configured to form surface finish element or create a finish element on the surface of the part. For example, using the same or a different type of laser, a third set of laser parameters may be configured to alter the reflectivity or optical properties of the surface of the part. In one specific example, the laser-based process may be configured to change the light reflective properties of the surface resulting in a more or less diffuse surface.

Regarding geometric elements of a feature, the laser may ablate, vaporize, melt or otherwise remove material from the surface to form a feature, such as a texture feature or repeating pattern. In some cases, a laser is used to ablate, vaporize, melt or otherwise remove material from the surface to form a three-dimensional surface or groove in the part. In some embodiments, a nanosecond, picosecond, or femtosecond laser may be used to form the individual texture features. As one non-limiting example, the laser employed to create patterns as described herein may have a focus of approximately 20-30 microns, a pulse width of 10 nanoseconds or less, and a frequency of about 100 kHz or greater. In some cases a laser having approximately a 1 micron wavelength is used. For example, a wavelength of 1064, 1030, of 1070 nanometers may be used depending on the laser configuration. It should be appreciated that any or all of these parameters may be changed as necessary. Embodiments may vary the pulse width (for example, between 5 and 20 nanoseconds, or more or less), repetition rate, spot or focus size and/or shape, the overlap and/or pattern formed through successive passes of the laser (one example of which may be a hatching pattern used to form raised texture features or larger texture features), the scan speed of the laser (which may be 1000 mm/sec or greater, and the laser frequency (which may be, as mentioned, from about 100 kHz or greater).

Regarding color elements of a feature, the laser may heat or melt material from the surface to alter the color or appearance of the surface. In some cases, a laser is used to facilitate the formation of an oxide on the part that may result in a dark or black-marked region. In some cases, the laser is focused or directed below an anodized or top layer to form an oxide below the surface of the part. In some embodiments, an infrared wavelength laser may be used, including, for example a picosecond pulsewidth infrared laser or nanosecond pulsewidth infrared laser. For example, one specific suitable laser is a 6 Watt infrared wavelength picosecond pulsewidth laser at 1000 KHz with a scan speed of 50 millimeters per second. Another example of a suitable alternative laser is a 10 Watt infrared wavelength nanosecond pulsewidth laser at 40 KHz with a scan speed of 20 millimeters per second.

Regarding surface finish elements of a feature, a laser may be used ablate or melt small light-scattering surface features to change the specular properties of the surface. In one example, a laser-based polishing process may use laser light having a wavelength of approximately 1064 nanometers, a laser pulse duration of approximately 30 nanoseconds at approximately 7 Watts may be sufficiently long for thermally melting light scattering surface features. In another example, a laser having a pulse duration of approximately 200 nanoseconds at approximately 9 Watts; a repetition rate of approximately 500 kHz; and a scan rate if approximately 1000 millimeters per second at a scan line pitch of approximately 5 microns may be used. More generally, for a laser-melt polishing process, laser pulses may be used having a pulse width within a range from approximately 20 nanoseconds to approximately a microsecond or more.

In some embodiments, the surface may be finished, treated, or otherwise processed prior to or after forming one or more features using a laser. As one non-limiting example, the surface may be made of aluminum and may be anodized prior to forming a feature using a laser-based process. In some embodiments, the surface may be further finished or otherwise processed after the laser-formed feature or pattern has been created. In other embodiments, such further processing may not occur. In yet embodiments, a laser-based process may form one or more features after an anodizing process has been performed. Further, the surface may be formed from any suitable material, including aluminum, steel, gold, silver and other metals, metal alloys, ceramics, wood, plastics, glasses, and the like. Various non-limiting examples are provided below with respect to FIG. 13 and other embodiments.

These and other embodiments are described in more detail with respect to specific examples depicted in the figures. However, those skilled in the art will readily appreciate that the detailed description given herein with respect to these figures is for explanatory purposes as the invention extends beyond these limited embodiments.

1. Example Features Formed Using a Laser-Based Process

An illustrative electronic device of the type that may be provided with one or more features as described above is shown in FIGS. 1A-B. The electronic device 10 may be a portable electronic device or other suitable electronic device. For example, electronic device 10 may be a laptop computer (as shown), other computer such as a desktop, a tablet, a cellular telephone, a media player, a gaming device, a camera, a wrist-watch device, headphone device, earpiece device, peripheral device such as a mouse or remote control, and/or the like.

The internal components of the device 100 may be surrounded at a peripheral region by a housing 130 that serves to support the internal components of the respective devices in their assembled position. That is, the housing 130 may enclose and support internally various components (including for example integrated circuit chips and other circuitry) to provide computing and functional operations for the device 100. The housing 130 may also help define the shape or form of the device 100. That is, the contour of the housing 130 may embody the outward physical appearance of the device 100. The housing may be widely varied. For example, it may be formed of plastic, glass, ceramics, fiber composites, metal (e.g., stainless steel, aluminum, etc.), other suitable materials, or a combination of these materials. In one embodiment, the housing 130 may include various ornamental and mechanical features (as described above) that improve the aesthetical appearance and tactile feel of the device.

The electronic device 100 may include a variety of output mechanism. By way of example, the electronic device 100 may include a display screen 102 that is assembled relative to the housing 130. The display screen is generally configured to present visual information to a user. The display screen 102 may, for example, include image pixels formed from light-emitting diodes (LEDs), organic LEDs (OLEDs), plasma cells, electronic ink elements, liquid crystal display (LCD) components, or other suitable image pixel structures. Furthermore, it may include a touch or force sensing mechanism within the screen itself. The display screen may also include a cover 103 formed from plastic, glass sapphire, and/or the like. In one embodiment, the cover 103 may include various ornamental and mechanical features (as described above) that improve the aesthetical appearance and tactile feel of the device.

The electronic device 100 may include a variety of input mechanisms that are configured to receive or accept user inputs. By way of example, the electronic device 100 may include a keyboard 104, track pad 105, and button 107. Although not shown, it may also include other input such as a joystick, dials, wheels, and the like. In one embodiment, one or more of the input mechanisms may include various ornamental and mechanical features (as described above) that improve the aesthetical appearance and tactile feel of the device. This may be done solely or in combination with other components such as the housing. For example, in the case of a key, button or dial, aesthetic or tactile features may be disposed on the key/button/dial and/or around the key/button/dial on the surface of the housing.

Device 100 may also include a variety of connector ports 106 including audio jack, data port connectors, removable media slots, etc. In one embodiment, one or more of the connector ports 106 may also include various ornamental and functional features that improve the aesthetic and tactile feel of the device 100. This may be done solely or in combination with other components such as the housing.

In some embodiments, the one or more components of the device (e.g., housing 130, display 102, inputs 104, connector ports 106) may include at least one patterned region. The patterned region may for example be formed using the techniques described herein (both above and below). For example, one or more of the components may include one or more features that form a pattern that effects the look and feel of the component and further the device 100.

Figure 1B:
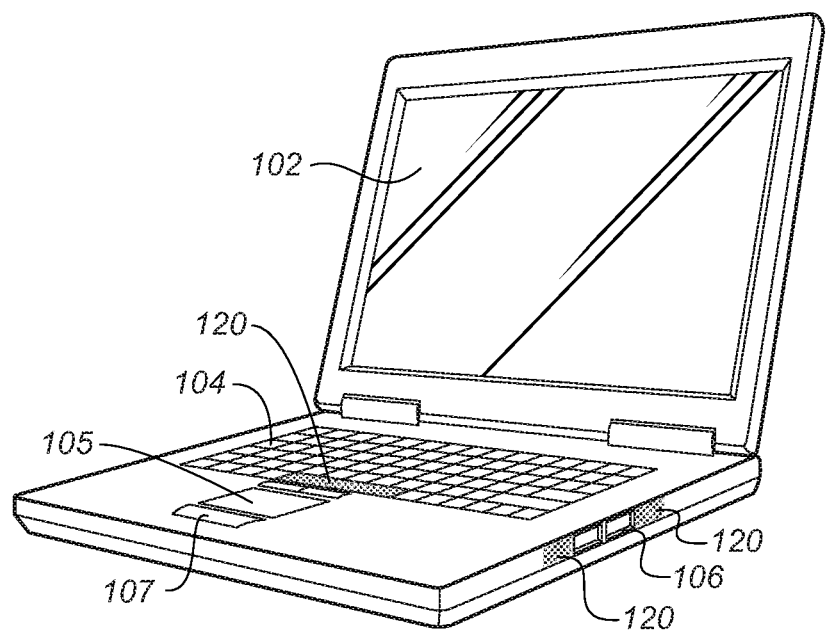

By way of example, As shown in FIG. 1B, the device 100 may include a housing 130 having a patterned region 120 as for example to form a logo or macro-scale design or other structure within the surface of the housing. In another example, the device 100 may include an input component (e.g., keyboard 104) having a patterned region 120 that creates a visual and/or tactile effects on its surface. In another example, the device may include a patterned region 120 around openings or other features, such as connector ports 106 or other inputs.

As shown in FIG. 1A, the example electronic device 100 includes a patterned region 120 and a non-patterned region 110 formed into a surface of the aluminum enclosure 130. The term "patterned region," as used herein, may be used to refer to a portion of a surface or structure on which a plurality of features are formed. The plurality of features may be a repeating pattern or random pattern or combination of both to produce the desired aesthetic and/or tactile effect. A "non-patterned region" lacks such a pattern or array, although it may have a different pattern, finish, or the like formed thereon.

The patterned region may contrast with the remaining areas of the surface of the mechanism. For example, the patterned region 120 may be formed adjacent to a non-patterned region 110. The non-patterned region 110 may be finished to provide first look and feel while the patterned region may be finished to provide a second look and feel.

The patterned region 120 may be formed from a number of features having geometric, color and/or finish elements that are random or repeat at regular intervals. The formation of features will be explained in further detail below.

Figure 2:
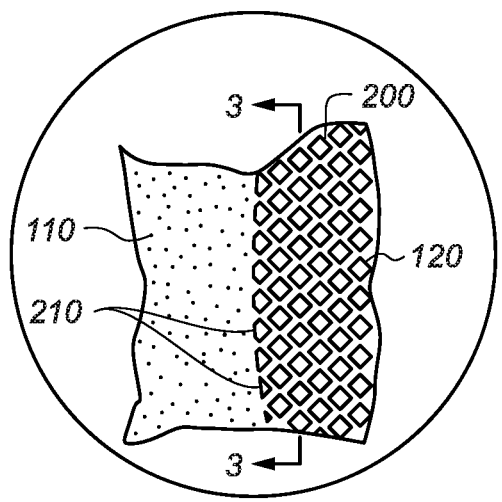
FIG. 2 depicts a detail view of a portion of the patterned surface of FIG. 1.

FIG. 2 depicts a detail view of a portion of the patterned surface of FIG. 1A. The detail view 1 of FIG. 2 depicts the array of texture features 200 having geometric elements that form the repeating pattern and also the interface between the patterned region 120 and the non-patterned region 110. The non-patterned region 110 may be finished by anodizing, blasting, polishing, chemically etching, or through any other suitable technique. The term "finishing" in this example may refer to a process or set of processes that is generally designed to place a surface in a completed state, but for the application of the texture features (e.g., texture features 200 of FIG. 2).

As shown in FIG. 2, the non-patterned region 110 may have a light texture or surface treatment after finishing. It may be blasted, for example. The surface treatment may or may not cause the surface to feel different than the surface does without the treatment. In certain embodiments, the treatment changes certain optical properties of the non-patterned region 110, such that it may appear to be a different color, brightness, finish (e.g., matte, glossy, semi-glossy, and the like) or otherwise reflect light differently than the surface does in the absence of the treatment.

Likewise, in some embodiments, the patterned region 120 may have different optical properties than either or both of the non-patterned region and the surface, prior to finishing. In some cases, the individual texture features 200 may be sufficiently small that they are individually indiscernible (or near-indiscernible) by the human eye. However, the array of texture features 200 may cooperate to change the optical properties of the surface. In this fashion a pattern shape, including, for example, a logo, graphic, text, or other shape, may be formed on the surface without creating a continuous depression or protrusion on the surface of the part. In some cases, the portion of the surface to be occupied by the pattern shape need not be subjected to additional processing, including, for example, engraving or etching the surface in order for it to be seen and appear contiguous. Instead, the pattern shape may be formed into the shape such that certain portions of the surface between the texture features 200 remain substantially untreated. It should be understood and appreciated that forming the patterned region 120 from a pattern of texture features 200 may leave areas substantially untouched between the texture features. That is, there may be areas between the texture features that are substantially unaltered during patterning. Thus, although the entirety of the patterned region 120 may appear uniform, in actuality there may be gaps or spaces between the texture features 200.

Figure 3A:
FIG. 3A is a first cross-sectional view taken along line 3-3 of FIG. 2, showing one sample set of texture features.
Figure 3B:
FIG. 3B is a second cross-sectional view taken along line 3-3 of FIG. 2, showing an alternative sample set of texture features.

The texture features 200 shown in FIG. 2 generally may include geometric elements that are either raised above or recessed below the top of the enclosure 130 or other surface. For example and as shown in FIG. 3A, the texture features may include pyramid-shaped geometric elements that extend upward from the top of the enclosure 130. Such features may be formed by applying a laser to ablate portions of the surface, effectively reducing the overall height of the surface in the patterned region 120. As another option depicted in FIG. 3B, the texture features 200 may include geometric elements that are recessed within or below the surface. A laser may ablate portions of the surface to form each geometric element of the texture features 200, such that the peak of each texture feature 200 is flush or near flush with the top of the surface. In either embodiment, the geometric elements of the individual texture features 200 may be sufficiently small to be visually imperceptible, as previously discussed. Likewise, the texture features 200 may be tactilely imperceptible. For example, the geometric elements of the texture features 200 may be sufficiently small that they cannot be distinguished by touch; this tactile imperceptibility may apply to the texture features either alone or when taken together. Further, in some embodiments, the patterned region 120 may feel identical to the non-patterned region 110, while in others the two surfaces may feel at least somewhat different. Thus, even if the individual texture features cannot be seen or felt, they may cooperate to give the patterned surface a different tactile effect, in certain embodiments.

Generally, controlling the dimensions, shape and spacing of the geometric elements of the texture features 200 may influence optical and tactile properties in the patterned region 120. The larger the geometric element of the texture feature 200, the more visible it is and the more easily a person can feel the feature. Likewise, greater spacing between individual texture features may contribute to tactile sensation or effect, in some embodiments. Further, the depth (or height), width, and/or length of the geometry may all be varied to change optical properties, feel, and perceptibility.

Returning to FIG. 2, it should be noted that a full-shape texture feature 200 need not be formed during creation of the patterned region 120. Partial-shape texture features 210 may be formed in certain circumstances, such as when the use of a full-shape texture feature 200 would extend beyond the edge of the border of the patterned shape. Since the texture features 200 are formed with a laser, rather than a drill, press, cutter or the like, there is no need to swap out physical machining parts to create a partial texture feature. The partial-shape texture features 210 may be especially useful in defining a border of a patterned region 120. In particular, as shown in FIG. 2, the partial-shape texture features 210 do not extend beyond a border of the pattern shape.

Figure 4:
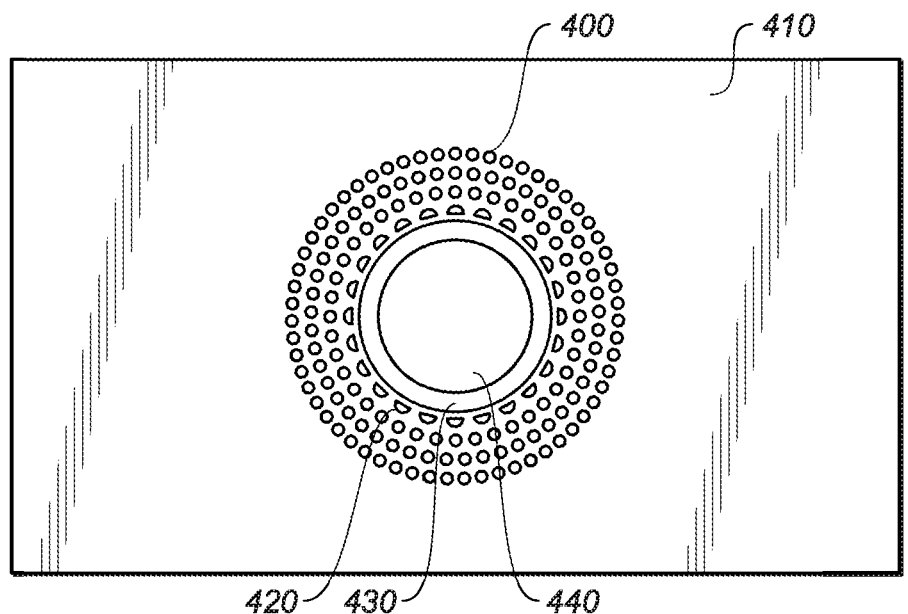
FIG. 4 depicts another example of a pattern that can be made from laser-forming a number of texture features.

FIG. 4 depicts another example of a feature that can be made from laser-forming a number of texture features. In particular, FIG. 4 depicts a button 440 surrounded by a pattern of texture features 400, 420. The button 440 depicted in FIG. 4 may be integrated with or assembled into an electronic device, including, for example, the device described above with respect to FIGS. 1A-B. Additionally, the button 440 may be integrated into other types of electronic devices, including, without limitation, a desktop, a tablet, a cellular telephone, a media player, a gaming device, a camera, a wrist-watch device, headphone device, earpiece device, peripheral device such as a mouse or remote control, and/or the like. In some cases, the button 440 may be used to operate an electromechanical, optical, or other type of switch. In some instances, the button 440 may provide user input to an electronic device in order to control aspects of the functionality or to interact with a user interface presented on a display screen.

As shown in FIG. 4, a patterned region of texture features 400, 420 may surround a button 440 that is offset from the texture features 400, 420 by a trim ring 430 or other offset feature. It should be appreciated that the trim ring 430 is optional and may be omitted in some embodiments. The texture features 400, 420 may cooperate to call attention to the button, to provide a different aesthetic look and/or tactile feel for the area around the button, and the like.

Figure 5A:
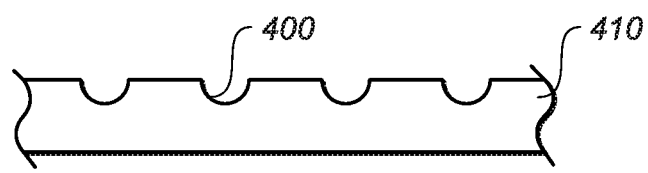
FIG. 5A depicts a cross-sectional view of a patterned surface formed from semi-spherical depressions.
Figure 5B:
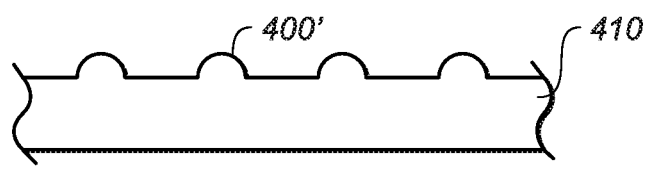
FIG. 5B depicts a cross-sectional view of an alternative patterned surface formed from raised features.

As shown in FIG. 4, one set of texture features 400 include geometric elements that are round in cross-section and formed in the surface 410. FIG. 5A shows a portion of the pattern in cross-section, specifically showing the semispherical depressions 400 formed in the surface 410 through operation of a laser. FIG. 5B depicts an alternative set of texture features 400' formed from geometric elements that raise or protrude from the surface 410.

As discussed above, the edge or border of the patterned region may be formed by one or more partial-shape texture features 420. Although the semi-shaped or partial-shape texture features 420 are shown as being spaced from the trim ring 430, in alternative embodiments they may abut the trim ring (or, in embodiments that lack a trim ring, may abut the button 440). The pattern formed by the texture features 400 differs from the pattern shown in FIG. 2. That is, the spacing and geometric relationship between texture features 400 may be varied, just as the actual dimensions of the features may likewise be varied.

In an alternative embodiment, the partial-shape textured features may surround the full-shape textured features to define a transition region. In some cases, the partial-shape textured features are surrounded by a non-patterned region on the surface of the part. In this way, partial-shape textured features can be used to transition the pattern into a non-patterned region or area.

Figure 6:
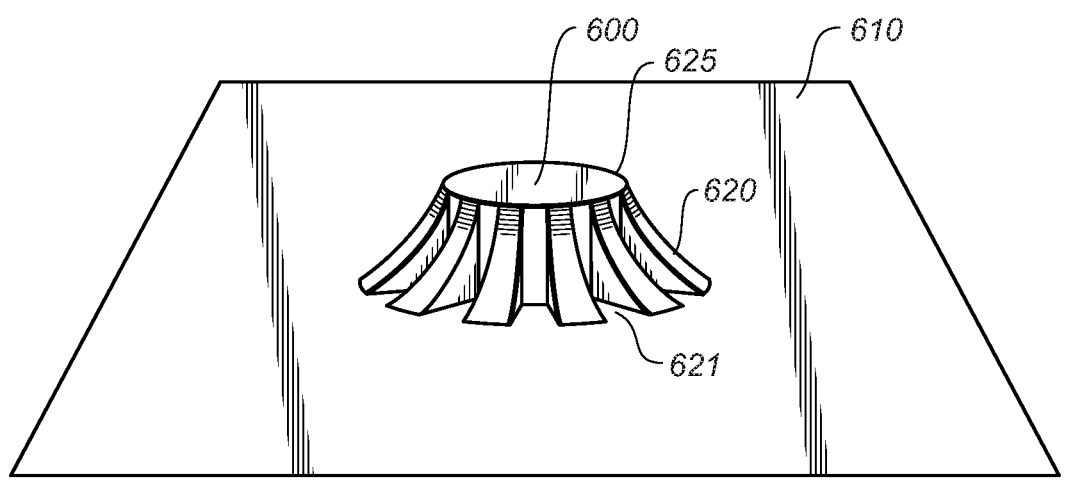
FIG. 6 depicts a surface feature having an array of ribs formed using a laser.

FIG. 6 depicts an object 600, such as a button, knob or other input element, formed from a surface 610 or extending from the surface 610. One or more features may be formed in a surface of the object using a laser. In the present example, an array of rib features 620 are formed around a circular hub feature 625. Each rib feature 620 includes an arcuate surface that extends from the hub feature 625 to the surface 610 of the object 600. In some cases, the arcuate surface is formed using a laser-based process, including, without limitation a laser-machining or laser-forming process. Thus, the rib features 620 may be laser-formed into three-dimensional surfaces as well as two-dimensional or planar surfaces. In an alternative embodiment, the arcuate surface is formed using a traditional forming or machining operation.

As shown in FIG. 6, an array of groove features 621 separate the rib features 620. In this example, each groove feature 621 is formed using a laser-based process. The grove features 621 may be formed, for example, using a laser-based ablation process configured to remove material from the part. Using a laser-based process, the groove features 621 may have straight walls and sharp corners that would be difficult or impossible to achieve using traditional machining operations. In particular, each groove feature 621 includes a back wall that connects two side walls of adjacent ribs. As shown in FIG. 6, the back wall and the two side walls connect at a sharp corner. Additionally, the back wall and the two side walls meet the surface 610 at a sharp corner. In some cases, the side walls meet a base of the feature or surface 610 at approximately a 90 degree angle.

Forming three-dimensional features having 90 degree corners between sidewalls and a base of the feature, as shown in FIG. 6 would be difficult, at best, with mechanical machining and/or cutting. As features become smaller, the difficulty may increase. Thus, creating such features in the sidewall of a button on a computing device (which is one example of the object 600) using one-step cutting or mechanical machining, may be extremely difficult, if not impossible. By contrast, using a laser-based process, a laser beam can precisely deliver laser energy to ablate, melt, or reflow material to form precise geometric elements of one or more features of the object 600.

Figure 7A:
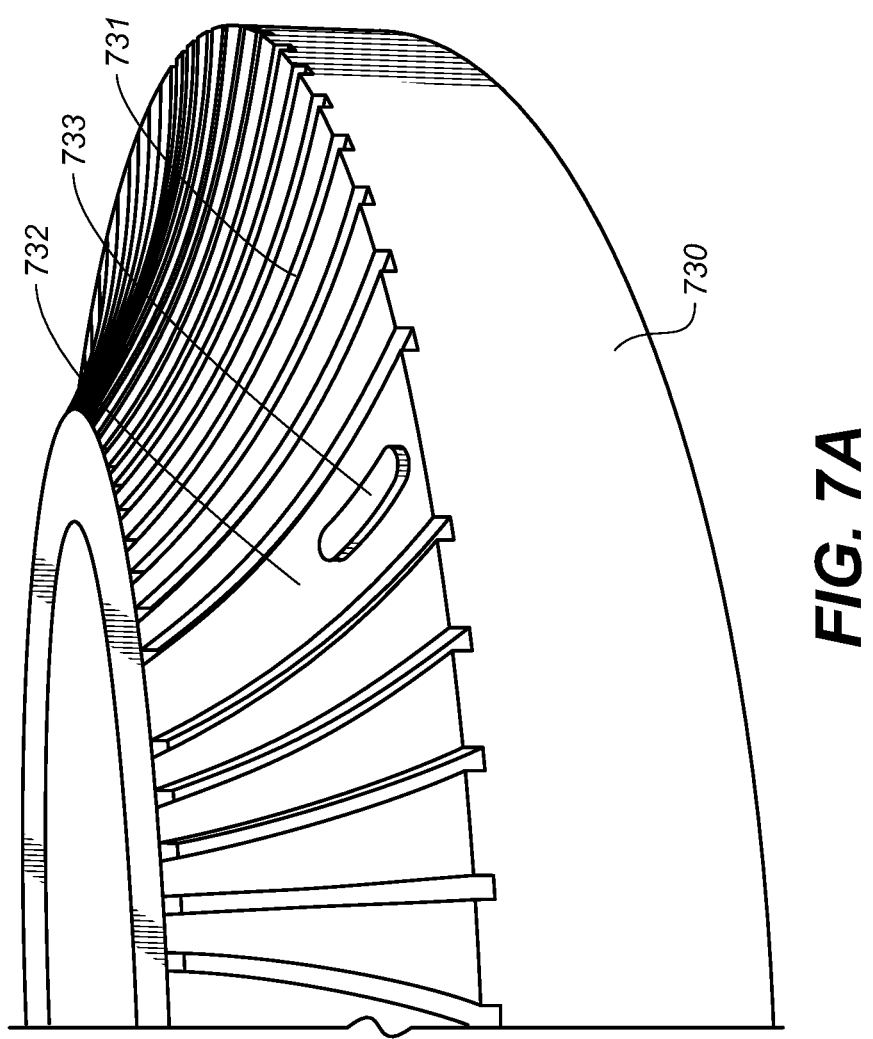
FIG. 7A-D depict a dial having features formed using a laser.

FIG. 7A depicts another example part that may be formed using a laser-based process. In particular, FIG. 7A depicts a laser-formed dial 730 that may be as a rotary input to a device or mechanism. The dial 730 may be assembled or integrated into an electronic device, such as the laptop computer (depicted in FIGS. 1A-B). Additionally, the dial 730 may be integrated into other types of electronic devices, including, without limitation, a desktop, a tablet, a cellular telephone, a media player, a gaming device, a camera, a wrist-watch device, headphone device, earpiece device, peripheral device such as a mouse or remote control, and/or the like. In some cases, the laser-formed dial 730 is attached to a potentiometer, optical encoder, or other electromechanical device that is configured to detect rotary motion. In some cases, the dial 730 is used to provide user input to the device and may be used to manipulate aspects of a user interface presented on a display screen. In some cases, features of the dial 730 may have geometric elements and/or finish elements that are configured to facilitate the turning function and/or to provide a particular tactile effect for a user's finger.

As shown in FIG. 7A, the dial 730 includes a circular hub feature and an array of rib features 732 separated from each other by a corresponding array of groove features 731. In some cases, the array of groove features 731 may be described as a knurl feature that is configured to enhance the grip or surface feel of the dial 730. While the groove features 731 are depicted as substantially straight striations arranged radially about the hub feature, other knurl-type configurations may also be used, including, without limitation, cross-hatched grooves, diamond-shaped grooves, spiral-shaped grooves, and the like.

In this example, one of the rib features is wider than the other rib features indicating an orientation of the dial 730. In some case, the widened rib feature 732 also includes a lozenge-shaped plug 733 that is attached to or formed into the rib 732. In other embodiments, another type of feature may be formed into the surface of the dial 730 to indicate an orientation.

As shown in FIG. 7A, each rib features 732 includes an arcuate surface that extends from the hub feature to a lower portion of the dial. As shown in FIG. 7A, the circular hub feature is offset from the lower portion of the dial and, thus the arcuate surface is characterized by a slight downward slope. As discussed above, the arcuate surfaces of the rib features 732 may be formed using a laser-based process to ablate or remove the material from a blank or solid plug of material. The blank or solid plug of material may be partially shaped by a casting or other forming process. In an alternative embodiment, the arcuate surfaces are formed using a machining operation. In other embodiments, the arcuate surfaces are formed by a casting or other forming operation.

As shown in FIG. 7A, each rib feature 732 is separated by a groove feature 731. In this example, each groove features is formed using a laser-based process, and therefore, may have straight walls and sharp corners. In particular, each groove feature 731 includes a back wall that connects two side walls of adjacent rib features 732. As shown in FIG. 7A, the back wall and the two side walls connect at a sharp corner. Additionally, the back wall and the two side walls meet a groove bottom at a sharp corner. In some cases, the side walls meet the groove bottom at approximately a 90 degree angle. In some cases, the grooves are too small to be detected by human touch individually, but collectively, they may provide increased friction or grip when operating the dial 730.

While, the dial 730 depicted in FIG. 7A is characterized as having a generally concave shape, in other embodiments, the dial 730 could be formed as a convex shape, or combination of concave and convex contours. By way of example, the dial could have generally cylindrical shape with a radiused or rounded outer edge. In addition, the geometric elements of the ribs and grooves, as well as the location and pitch of those elements may be configured to produce a specific tactile effect. In some cases, color and/or finish elements are also combined with the geometric elements and are selected or configured to produce an specific consumer or user experience. For example, the dial 730 may include contrasting colors, and/or a surface finish that produces a specific aesthetic and/or tactile effect for the user. In one instance, the groove feature 731 may have a dark or black color element that contrasts with the rib features 732, which may have a light or white color element.

Figure 7B:
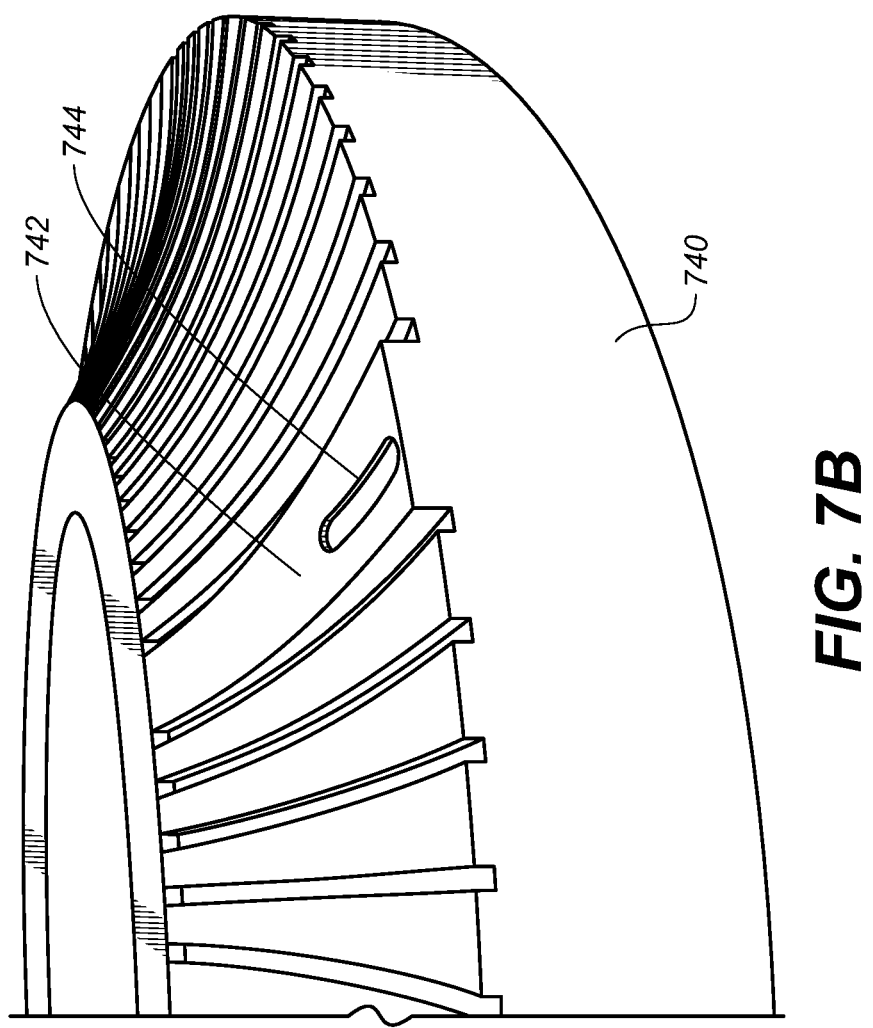

FIG. 7B depicts another variation of a laser-formed dial. As shown in FIG. 7B, the dial 740 includes a raised rib 742 having an arcuate surface that is higher than the arcuate surfaces of the other ribs in the array. As shown in FIG. 7B, the raised rib 742 is also wider than the other ribs in the array. By forming a raised rib 742, the orientation of the dial may be detected by touch, as well as visually. This may assist a user in determining the orientation of the dial 740 which may indicate how much rotation has occurred or how much rotation needs to occur.

As shown in FIG. 7B, the dial 740 also includes an index feature 744 that is formed into the surface of the rib 742. In the present example, the index feature 744 is a lozenge-shaped recessed pocket. In some cases, the lozenge-shaped plug 733 of FIG. 7A may be inserted into the index feature 744. In one example, the lozenge-shaped plug 733 is press fit into the index feature 744. In another example, the lozenge-shaped plug 733 is attached to the index feature 744 using an adhesive. For example, an amount of adhesive may be placed at the bottom of the index feature 744 and then the lozenge-shaped plug 733 placed on the adhesive. In some cases, the amount of adhesive is used to set the height of the lozenge-shaped plug 733 with respect to the surface of the rib 742. The index feature 744 and or the lozenge-shaped plug 733 may be dyed or colored to enhance the visual appearance and facilitate visual detection of the orientation of the dial 740. In some cases, the index feature 744 is filled with an ink, paint, or other curable liquid material instead of inserting the lozenge-shaped plug 733.

Figure 7C:
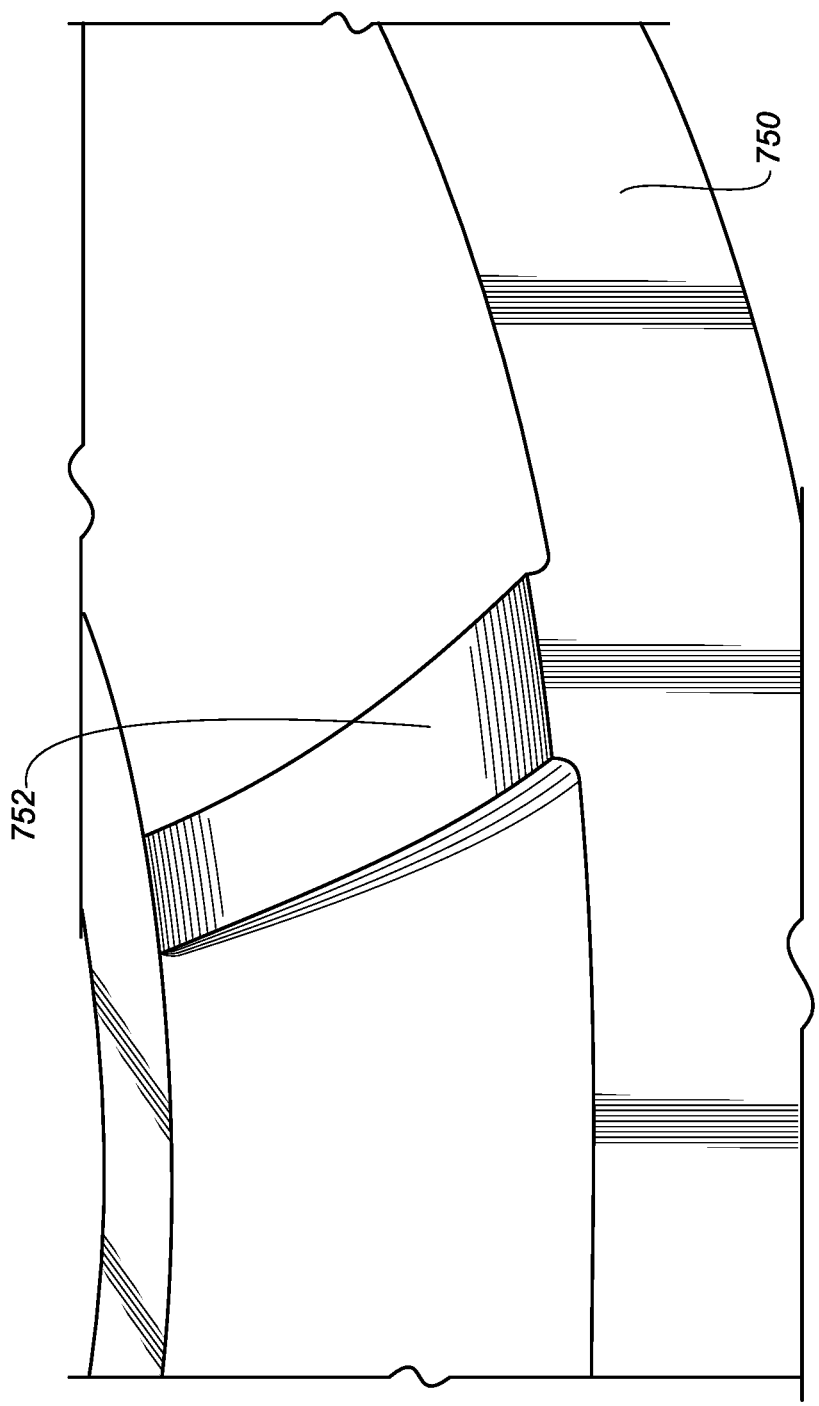
Figure 7D:
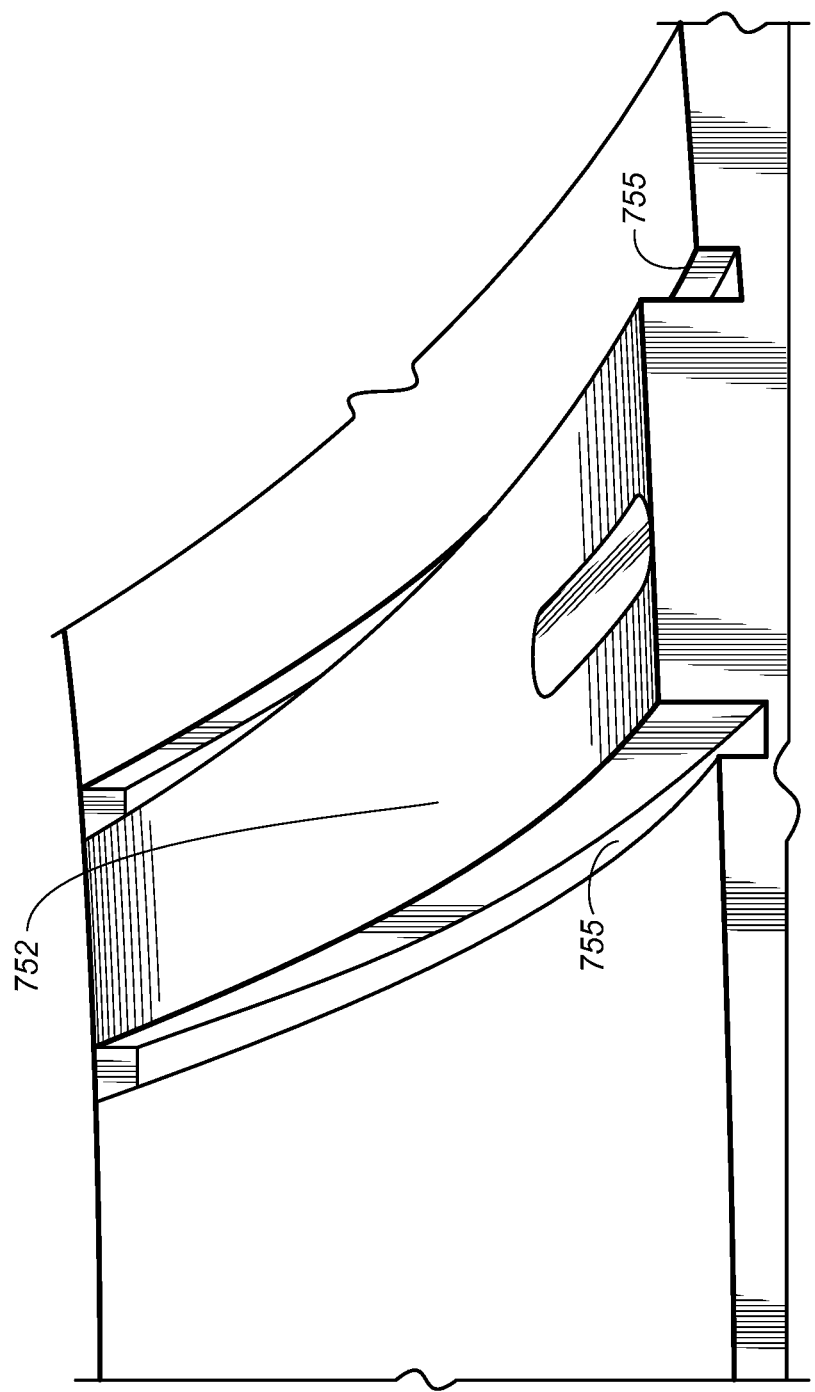

FIGS. 7C and 7D depict a dial 750 having groove features 755 formed on either side of a rib feature 752. As shown in FIG. 7C, a raised rib 752 may be formed on the surface of the dial 750. The raised rib 752 may be formed using a laser-machining process or other forming process, as discussed above. In some cases, the raised rib 752 may be formed having a rounded radius at the side wall where rib 752 meets the body of the dial 750. The rounded radius may be formed by a machining operation or may be the byproduct of a casting or other forming technique. As shown in FIG. 7D, the rounded radius may be removed by laser-forming a groove features 755 on either side of the rib feature 752. As shown in FIG. 7D, because the groove features 755 are formed using a laser-based process, the groove features 755 may have straight walls and sharp corners. In particular, each groove feature 755 includes a back wall that forms the rear of the groove feature 755. As shown in FIG. 7D, the back wall and the two side walls connect at a sharp corner. Additionally, the back wall and the two side walls meet the groove bottom at a sharp corner. In some cases, the side walls meet the groove bottom at approximately a 90 degree angle. In some cases, the groove features 755 are formed using a laser during the same process as an array of grooves that separate the other rib features formed in the dial 750.

Figure 8A:
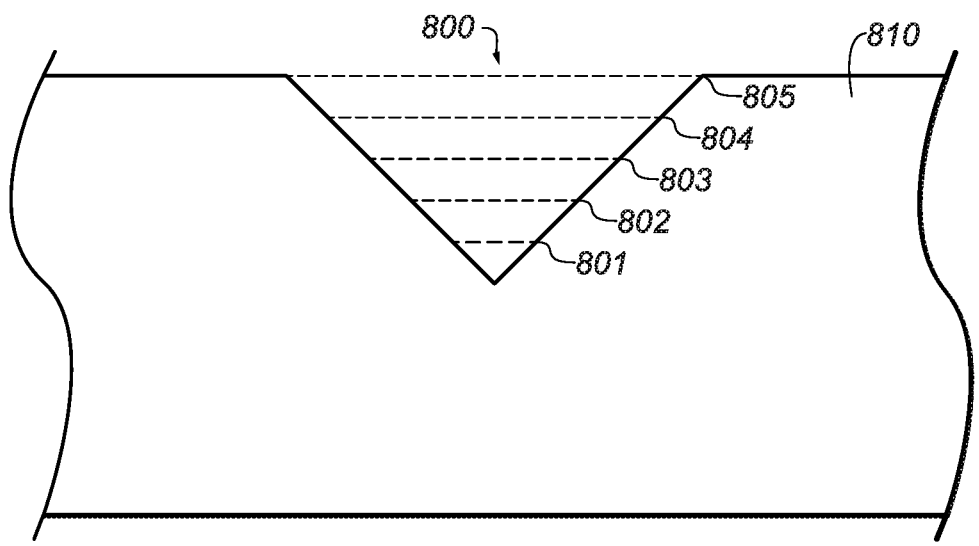
FIGS. 8A-C depict cross-sectional views of sample features formed in a surface.
Figure 8B:
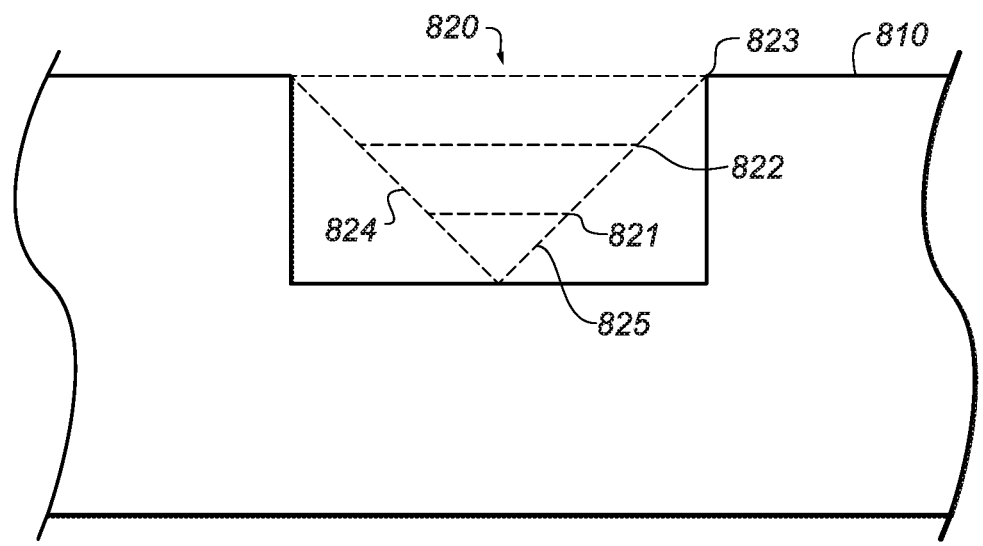
Figure 8C:
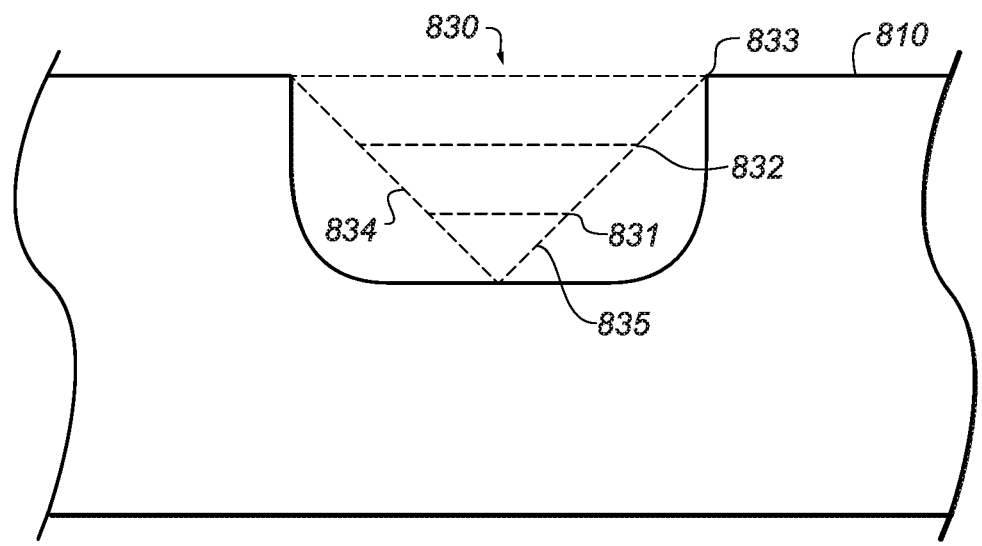

A laser can be used to form a variety of other features by ablating material to create a cavity or depression geometric element. FIGS. 8A-C depict cross-sectional views of sample features that may be formed using laser ablation techniques. For ease of illustration and explanation, it should be appreciated that the following examples are non-limiting and that the techniques may be applied to features having a variety of feature geometries and formed in a variety of surfaces.

FIG. 8A depicts a side cross-sectional view of a sample feature 800 formed in a surface 810. In order to form the feature 800, certain example processes may form successive sections of the feature. For example, the deepest part of the feature, or the center part of the feature 801, may be initially formed. Next, a somewhat shallower section 802 located above the initially-formed part 801 of the feature may be formed. Section 803, which overlies section 802, may be next formed, with section 804 following that, and finally section 805 is formed as the widest portion of the feature.

By forming a feature starting with its deepest point (or, equally, its center point or a point offset from a sidewall of the final feature), successive operations in forming the feature may eliminate debris or excess material left over from forming the deepest point. That is, once region 800 of the feature has been laser-formed, some material may have flowed or been ejected out of region 800. As the laser forms region 802, it eliminates this unwanted material. In this fashion, little or no burring, overflow or other excess material is left on the surface 810 after feature 800 is formed. Accordingly, even after forming multiple texture features in a small patterned area, the feel of the patterned area may be relatively smooth and/or burr- and defect-free.

A similar technique can be used to form a feature having straight walls, as shown in FIG. 8B. Specifically, a laser can be used to form the feature 820 in a surface 810 in a series of stages or sections. The feature 820 may be formed in a series of sections starting with section 821, which may ablate material near the center of the deepest part of the feature 820. A subsequent section 822 may then ablate a wider region of material at a depth that is more shallow than section 821. A top section 823 may then be formed at or near the full width of the feature 820 and at a depth that is more shallow than section 822. Sections 821, 822, and 823 are provided as examples, and more sections or fewer sections may be used to form the feature 820. Two final sections 824 and 825 may then be formed to remove the material in the corners of the feature 820. The resulting feature 820 may have substantially straight walls and may be relatively smooth and/or burr- and defect-free.

FIG. 8C depicts the same technique applied to a feature 830 having rounded side walls. Similar to as described above, a laser can be used to form the feature 830 in a surface 810 in a series of stages or sections. Section 831 may ablate material near the center of the deepest part of the feature 830. A more shallow section 832 may then ablate a wider region of material and finally a top section 833 may ablate material at or near the full width of the feature 830. Two final sections 834 and 835 may then be formed to remove the material in the corners of the feature 830. Similar to as described above, the resulting feature 830 may have rounded corners and may be relatively smooth and/or burr- and defect-free.

The features depicted in FIGS. 8A-C and techniques described above may be used to form the geometric element(s) of a texture feature, including, for example, the full-shape and partial shape texture features described herein. Additionally, the features depicted in FIGS. 8A-C may be combined with any of the other laser-based operations described herein to create a finished part.

Figure 9A:
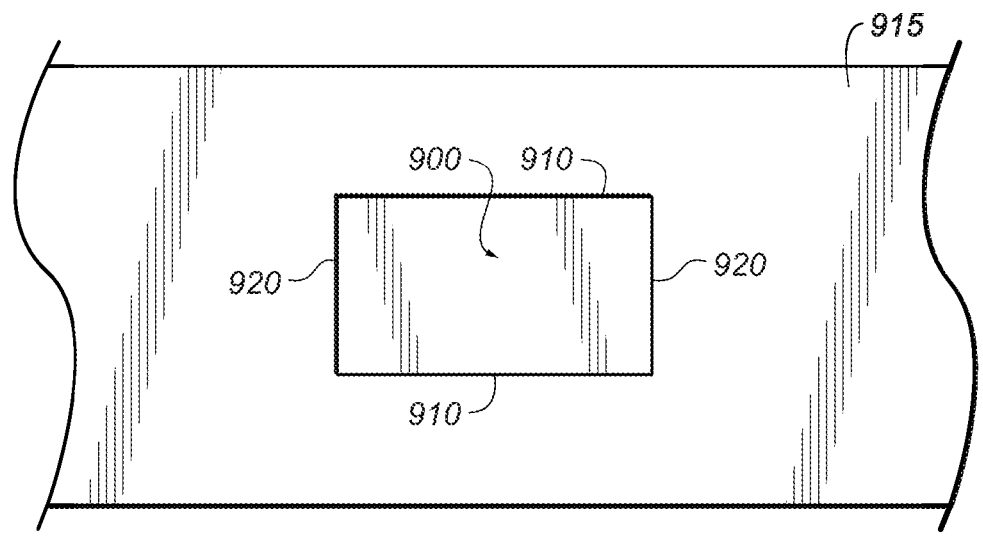
FIG. 9A depicts another sample texture feature formed in a surface.
Figure 9B:
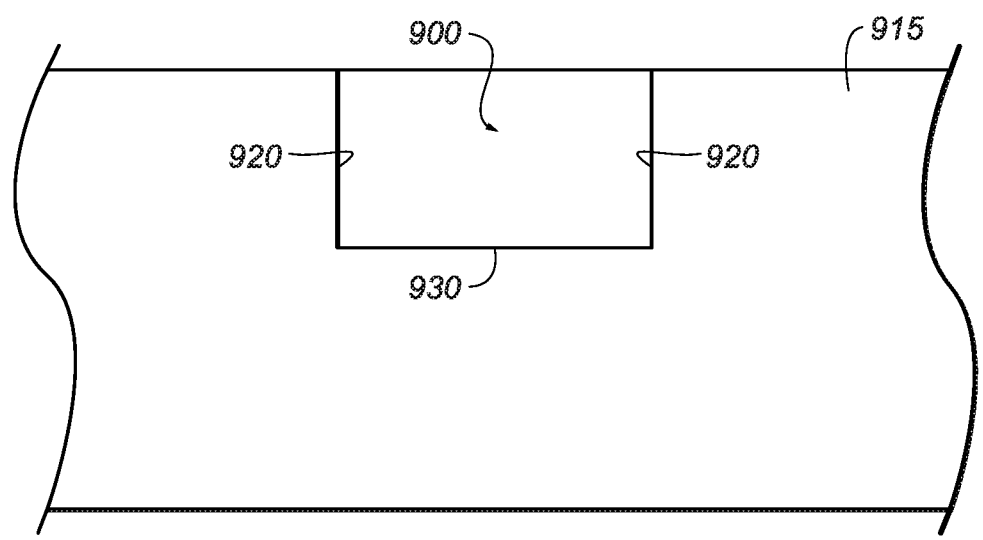
FIG. 9B is a cross-sectional view of the sample texture feature of FIG. 9A.

FIG. 9A generally depicts another sample texture feature 900 formed in a surface 915. The texture feature 900 includes rectangular geometric element, with 90 degree angles between the sidewalls 910, 920. Further, as shown in the cross-sectional view of texture feature 900 that is shown in FIG. 9A, the texture feature 900 has sidewalls 920 that are generally perpendicular to a base 930. As previously mentioned, these angles and configurations may be difficult to achieve with many traditional machining operations.

Figure 10:
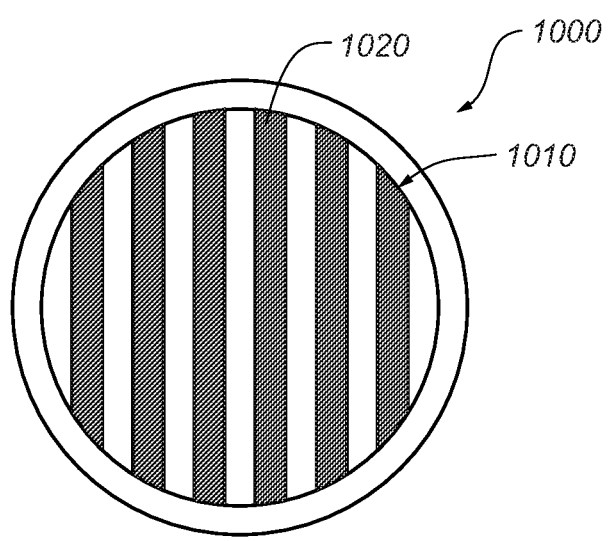
FIG. 10 is a top-down view of a sample button having multiple texture features formed in its upper surface.

FIG. 10 is a top-down view of a sample button 1000 having multiple texture features 1020 formed from a pattern of fine geometric elements on the surface of the button 1000. The texture features 1020 alternate with non-feature regions 1010. By creating texture features 1020 in the surface of the button 1000, frictional engagement between the button surface and a user's skin may be enhanced, thereby permitting the button to slide or otherwise change position more easily. Thus, a repeating pattern of texture features 1020 may produce a desired tactile effect.

As also shown in FIG. 10, the texture features 1020 may have a color element that differs with respect to the non-feature regions 1010. For example, the texture features 1020 may include a color element that may be formed, for example, through application of a suitable laser-based coloring process. As one non-limiting example, a texture feature may include a color element that includes a black-marked and/or white-marked region that is formed using a laser-based process. In some embodiments, the geometric elements and color elements of the texture features 1020 may be formed and colorized using the same laser-based operation.

Figure 11A:
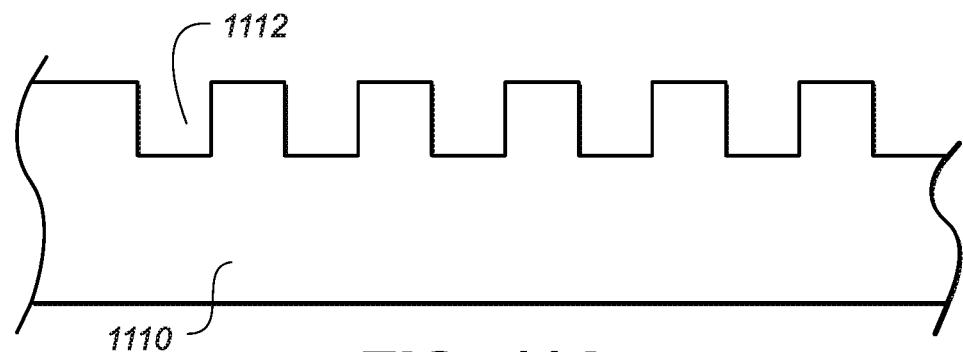
FIG. 11A-B depicts example features formed into a surface.
Figure 11B:
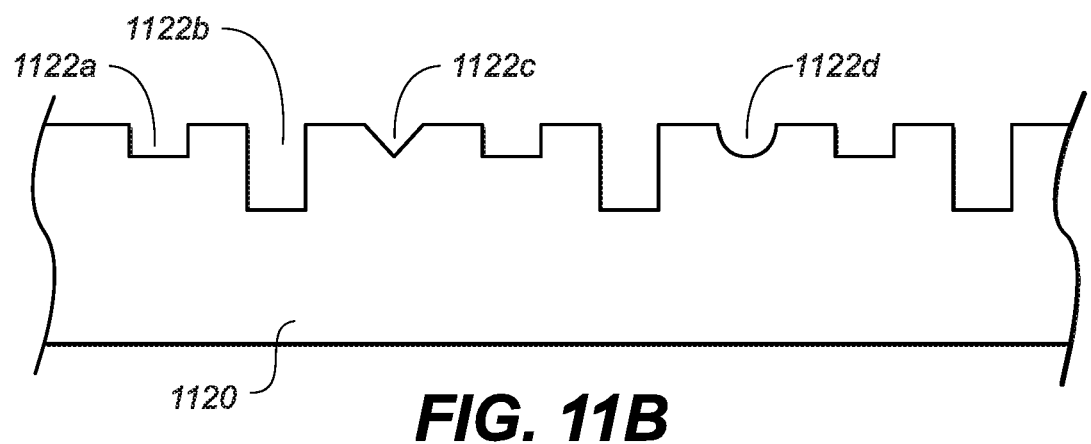

FIGS. 11A-B depict contrasting examples of how a pattern of features may be regularly repeating or may be varied. As shown in FIG. 11A, a feature 1112 may be formed into a part 1110 at a regularly repeating pattern. In particular, a feature 1112 may include a rectangular geometric element that is formed using a laser-based process, as discussed herein. The features 1112 depicted in FIG. 11A may be formed substantially uniform in shape and at a substantially uniform spacing or pattern pitch.

In contrast, FIG. 11B depicts a pattern of features 1122a-d that are varied or random in both shape, location, and occurrence. As shown in FIG. 11B, a laser-based process may be used to form a pattern of fine features 1122a-d in a part 1120 that may be difficult to achieve using traditional machining processes. As shown in FIG. 11B, the depth of the features may vary, as comparing the depth of feature 1122a to 1122b. Additionally, the shape and size of the features may vary as comparing the rectangular geometry of features 1122a and 1122b with the angled geometry of feature 1122c and the semi-circular geometry of feature 1122d. In addition, the spacing or pitch of the features 1122a-d may vary across the surface of the part 1120. As shown in FIG. 11B, the location or occurrence of the various features 1122a-d may also vary or occur in random. Thus, a variable or random pattern of features may be formed using a laser-based process, and thus may accommodate a variety of geometric configurations.

Figure 12:
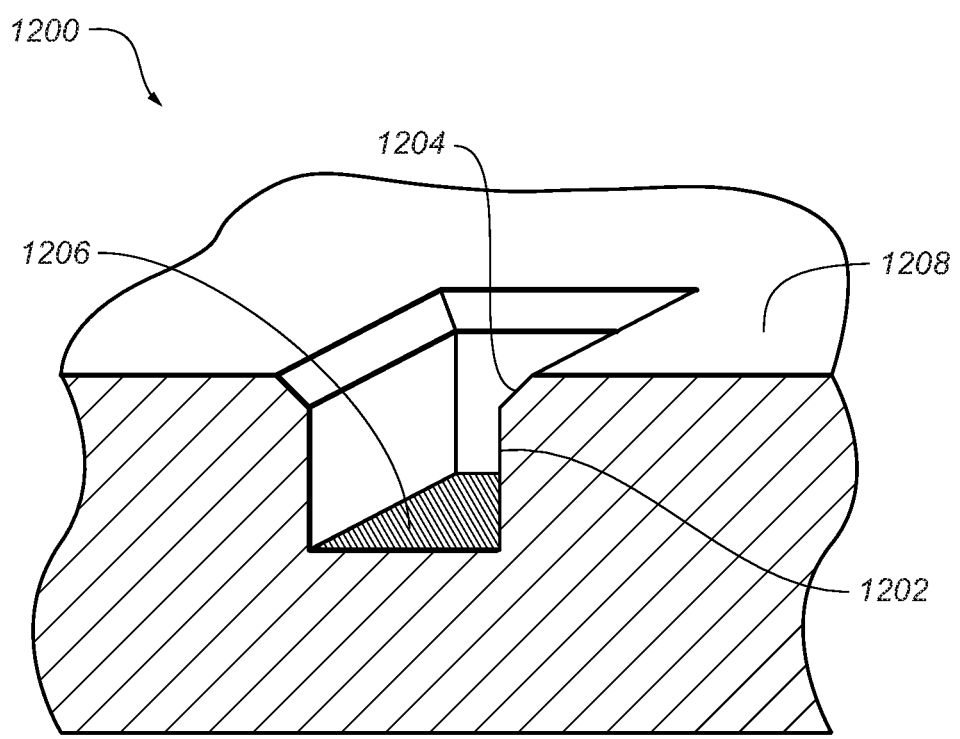
FIG. 12 depicts a laser-formed feature having a geometric element, a color element, and a surface element.

In some embodiments, multiple types of features can be formed using a laser on the same surface to form a finished part. FIG. 12 depicts an example feature 1200 formed into the surface of a part that has been created using multiple laser-based features. In the example depicted in FIG. 12, a geometric element 1202 may be formed as a rectangular depression or recess in the surface of the part. As shown in FIG. 12, the geometric element 1202 may include fine features, including, for example, sharp corners and chamfers 1204 that are formed using a laser ablation or other material removal process. As shown in FIG. 12, the feature 1200 may also include a colored element 1206 formed into the geometric element 1202. The colored element 1206 may be formed using a laser-based process that locally heats the material to form an oxide or darkened region. Additionally, the feature 1200 may include a surface finish element 1208 that may be applied to the surface surrounding the feature 1200, as well as portions of geometric element 1202. By way of example, the surface finish element 1208 may be formed on the side walls and/or bottom of the geometric element 1208. The surface finish element 1208 may also be formed using a laser-based process that uses a laser beam to affect the way that various surfaces of the part interact with light.

In general, after any of the above referenced features are formed using one or more laser-based processes, the features or a patterned region of features may be processed and/or refinished in any suitable fashion. Color may be added, resealing may be performed (if the original surface was sealed), another surface finish may be added, and so on. Because the initial surface may be completely finished prior to laser-forming the features, it may not be necessary to process and/or refinish the non-patterned or feature-free regions at all. Thus, in some cases, embodiments may be formed with significant time savings by laser-forming features in a region after performing finishing/processing operations on an entire surface.

It should also be appreciated that using a laser-based process to form features may be applied to a finished surface of a material, rather than an unfinished surface. Thus, features may be laser-formed on a surface that is already cosmetically complete except, for example, the texture features. In other words, the features may be formed "top down" on the finished surface, rather than from "bottom up" from an unfinished back side of a material. The advantage of this approach is that a laser-based feature forming process can be reserved until a majority of the manufacturing processes have already been completed and passed a quality inspection.

2. Example Laser-Based Processes

Laser-formed features, as described in some of the embodiments, may be formed through the operation of a single laser or multiple lasers. As one example, a laser may have a 20-30 micron focus and be suitable to create a variety of texture features and patterned regions. Either nanosecond and picosecond lasers may be used, or both may be used together to create texture features. Depending on the material, a picosecond laser may be suitable for ablating or otherwise removing material without adding much heat to the material, while a nanosecond laser may be good at creating a texture feature having a bright or reflective surface, or annealing oxide layers of a surface.

Additionally as previously mentioned, a laser can be used to create a black marked or white marked feature. In one example, a laser can be used to change the color of an aluminum part by creating a localized heated region. In some cases, a laser can be used to heat or melt a localized region of the aluminum on the surface of the part, which may cause an oxidation process to occur over that region. Depending on the type of aluminum or metal alloy used and the parameters of the laser, the oxidation process may create a darkened or black-marked region. In some cases, the oxidation process creates a lightened or white-marked region. In some cases, the black-marked or white-marked region is formed on a part that has been anodized or coated without significantly affecting the anodized coating. For example, in some circumstances, the laser marking may be performed by focusing a laser below the anodized layer to create a black-marked or white-marked region below the anodized layer.

This technique may be used to create a colored feature on of the surface by scanning the laser over an area. A laser may also be used to remove an anodized or colored layer that has already been applied to the surface of the part. In this way, a laser can be used to create a contrasting feature having a color or surface finish that is different than the surrounding area. Additionally, in some cases, a laser can also be used to alter the reflectivity of the surface of the part. For example, a laser can be used to change the surface finish of the part to enhance the diffuse or specular properties of the surface.

As previously mentioned, laser-formed texture features may be formed in a surface made from a variety suitable materials. For example, texture features may be formed in 6000 series aluminum through the methods and operations described herein. Other example materials that may also be suitable for laser-forming texture features, include, without limitation, 7000 series aluminum, stainless steel, other metals and alloys, ceramics, plastics, and organic materials.

Figure 13:
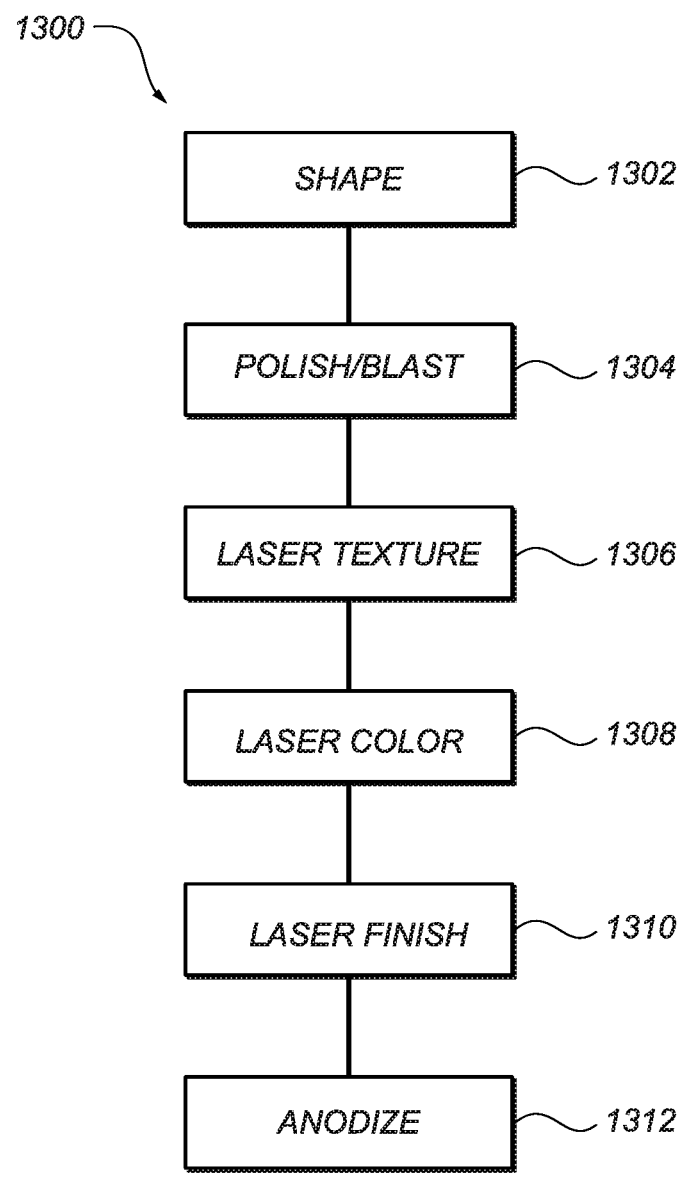
FIG. 13 depicts a flow chart of an example process for creating a finished part using multiple laser processing operations.

In some embodiments, multiple types of features can be formed using a laser on the same surface to form a finished part. In particular, multiple laser-based operations may be performed on a part to create a desired aesthetic and/or tactile effect. FIG. 13 depicts a flow chart of an example process 1300 that can be used to create a finished part using multiple laser-based operations.

In operation 1302, a surface of the part is formed or machined. In some embodiments, a machine cutting tool is used to create a profile or contour shape for a part. For example, an end mill, ball mill, or other type of rotating cutting tool can be used to form an initial shape for the surface of the part. Other types of machining operations may also be used, including, for example, turning operations, drilling operations, or other types of operations used to form the initial shape for the surface of the part.

In some implementations of operation 1302, a laser-based process is used to laser machine the initial shape for the surface of the part. For example, with reference to FIG. 7A, a laser-based process, such as a laser machining operation, may be used to create the three-dimensional arcuate surface for the rib 732. As previously discussed, laser machining operation may also be used to create the groove features 731. Additional examples of laser machining or laser forming operations are also provided above with respect to the laser-formed depression features of FIGS. 8A-C.

In embodiments, a laser can be used creating raised texture features (such as those shown in FIGS. 3A and 5B, for example). In some cases, a laser may be used to remove material from the surface between the features through hatching. A hatching operation may have the laser remove material at different angles, for example, to create a relatively uniform surface between protruding features. Additionally, a laser may be used in a knurling operation to define a series of ridges, protrusions, and the like. The resulting knurl may aid in frictional engagement between an object on which the knurl pattern is formed and a user's skin. An example laser-created knurl is described above with respect to FIG. 7A.

In some implementations of operation 1302, a series of holes or a perforation may be formed. Using traditional machining techniques, the holes may be formed using a drilling, punching, or other hole forming operation. Alternatively, the series of holes or perforation may be formed using a laser. A laser-formed hole may be more precisely formed and may not exhibit burrs, tears, or other imperfections that may be associated with a traditional drilling operation. In some cases, a laser can be used to form a series of very small holes as part of a perforation or micro-perforation feature. Using a laser-based process, the size and pitch of the holes of the perforation may be more precisely controlled as compared to some traditional machining techniques.

In operation 1304, a surface of the part is polished and/or blasted. In some embodiments, an abrasive polishing tool or sand blasting tool is used to create a desired surface finish on the surface of the part. In some cases, operation 1304 removes any machining marks created during operation 1302 and may also remove burrs or other surface anomalies.

In some implementations of operation 1304, a laser-based process is used to polish the surface of the part. In one example, a laser-based process is used to ablate the surface of the part to create the desired surface finish. A laser-based process can also be used to ablate or cut away burrs or other surface anomalies. A laser may also be used to produce a surface finish similar to a surface finish that may be formed by a sand blasting or other abrasive surface finish operation.

In some cases, operation 1304 may be optional. For example, if the machining operation of 1302 results in a satisfactory surface finish, additional polishing or blasting may not be necessary in operation 1304. Thus in some implementations of process 1300, operation 1304 may be omitted.

In operation 1306, a laser texture is formed on the surface of the part using a laser-based process. In particular, an array or pattern of laser texture features may be formed on the surface of the part. In some cases, the depth, pitch, and arrangement of the individual texture features may be set to provide a particular texture. As discussed above, in some cases, the individual texture features may not be discernable to the eye, but the array or pattern of texture features may collectively interact with the reflected light to produce a desired effect. Example texture features and the creation of example texture features is provided above with respect to FIGS. 1A, 2, 3A-B, 4, and 5A-B.

In operation 1308, a laser color feature is formed on the surface of the part. In some embodiments, a laser is used to form a darkened or lightened region on the part. As discussed above, a laser can be used to form black- or white-marked region on the part. In some examples, the black- or white-marked region is used to create a pattern or shape on the surface of the part. The laser coloring operation may also be used to create human-readable text, machine readable coding, and/or coded information on the surface of the part.

In some cases, the laser coloring may be used to highlight existing features on the part. For example, if an array of groove features or a knurl feature is formed in the surface of the part as part of machining operation 1302, the groove features may be visibly highlighted by white-marking the non-grooved portion of the surface of the part. In some cases, the entire surface may be white marked using a laser before the array of groove features or a knurl features is formed in the surface. An example of an array of groove features or knurl feature is provided above with respect to FIG. 7A.

In operation 1310, the surface of the part may be polished using a laser-based process. In one example, a laser-based process is used to ablate the surface of the part to create the desired surface finish. A laser-based process can also be used to ablate or cut away burrs or other surface anomalies.

In operation 1312, the surface is anodized to create an anodized coating. In particular, in some embodiments, an anodized or oxidized surface is formed on the surface of the part using an electrolytic solution and an electric current. The depth and hardness of the anodized coating may be determined, in part, based on the amount of current, the composition of the electrolyte solution, and the type of material that is being anodized.

In some cases, the anodization process of operation 1312 may slightly alter the color or darkness of the surface of the part. For example, an anodized coating may result in the texture features or color features appearing slightly darker than had the surface not been anodized. Thus, in some cases, the parameters associated with the texture features formed in operation 1306 or the color feature created in operation 1308 may be adjusted to compensate for a subsequent anodization operation. In particular, the texture features and/or the color features may be formed to be slightly lighter in color in order to compensate for any darkening that may occur due to an anodization process.

Alternatively, the anodization operation 1312 may be performed before the laser texturing operation 1306 or before the coloring operation 1308. As previously discussed, a laser may be used to form a texture feature or textured pattern on the surface of a part after it has been anodized. Also, as described above, a laser can be used to form a color feature on a surface after anodizing by, for example, focusing the laser below the anodized layer. On advantage to anodizing the surface before forming either texture features and/or color features, is that the final color and darkness of the texture features and/or color features may be less impacted by the anodization of the surface.

With regard to process 1300, the order in which the operations are performed does not have to follow the sequence of the discussion above or the arrangement of the operations depicted in FIG. 13. As described above, the anodization operation 1312 may be performed before or after either the texturing operation 1306 and/or the coloring operation 1308. Similarly, the machining operation 1302 and polishing/blasting operation 1304 may be performed at different times with respect to the other operations of process 1300.

The process 1300 is one example how multiple laser-based operations may be used to achieve a particular surface finish or aesthetic effect on a part. In some cases, the entire process 1300 may be performed by laser-based operations. In this case, the part may be formed from start to finish without removing the part from a laser processing machine or station. This may be advantageous in reducing number of times a part is handled and fixtured, and may result in certain processing efficiencies. An example system for performing one or more of the laser-based operations of process 1300 is provided below with respect to FIG. 14.

The combination and order of the operations may be varied to produce a particular aesthetic and/or tactile effect. By way of example, a variety of specific laser-based processes may be combined with other manufacturing processes to produce a part having a specific aesthetic and/or tactile effect. In particular, the following sets of example process flows describe a potential order of manufacturing operations that may be used to produce a finished part. For purposes of the following examples, a laser-based engraving process includes any process that uses a laser to form a geometric element of feature in a part. Also, a laser-based coloring process includes any process that uses a laser to form a color element of the feature in a part. As described above, a laser may be used to form a black-marked or white-marked element. In some cases, the laser-based coloring process may also include a laser-based surface finish process that forms a surface finish element having, for example, a particular a specular reflectivity.

In a first set of example process flows, a laser-based engraving and laser-based coloring processes are used to form a finished part. In one example process flow, a surface of the part may be blasted using a bead-blasting process and then anodized before using a laser-based engraving process to form a geometric element of one or more features. A laser-based coloring process may then be used to form a colored element of one or more features. In an alternative process flow, the anodizing operation is performed after the laser-based engraving process, but before the laser-based coloring process. In yet another alternative process flow, the anodizing operation is performed after both the laser-based engraving process and the laser-based coloring process.

In a second set of example process flows, the part is laser engraved before the part is blasted. In one example process flow, a laser-based engraving process is used to form a geometric element of one or more features before blasting the surface of the part. In one process flow, the part is anodized before a laser-based coloring processes is used to create a color element. In an alternative example process flow, the laser-based coloring process is used before the part is anodized.

In a third set of examples process flows, the part may be polished using a mechanical polishing process before being engraved and colored using a laser. In one example process flow, the part is polished, anodized, laser engraved using a laser-based process, and then laser colored using another laser-based process. In an alternative example process flow, the part is polished, laser engraved, anodized, and then laser colored. In yet another alternative process flow, the part is polished, laser engraved, laser colored, and then anodized.

In a fourth set of example process flows, the part may be blasted before being machined using a computer numeric control (CNC) or chemical etching process. In one example process flow, the part is blasted, anodized, and machined before using a laser-based coloring process to create a color element and then re-anodizing. In an alternative example process flow, the part is blasted and machined before using a laser-based coloring process to create a color element and then anodizing. In yet another alternative example process flow, the part is blasted and machined before anodizing and then using a laser-based coloring process to create a color element.

In a fifth set of example process flows, the part may be polished before being machined using a CNC or chemical etching process. In one example process flow, the part is polished, anodized, and machined before using a laser-based coloring process to create a color element and then re-anodizing. In an alternative example process flow, the part is polished and machined before using a laser-based coloring process to create a color element and then anodizing. In yet another alternative example process flow, the part is polished and machined before anodizing and then using a laser-based coloring process to create a color element.

In a sixth set of example process flows, the part is subjected to two anodizing processes. In one example process flow, the part is blasted, anodized, and laser engraved before being re-anodizing. In an alternative example process flow, the part is polished, anodized, and laser engraved before being re-anodizing. In some cases, the re-anodizing operation is performed to color and protect the portion of material exposed during the laser engraving processes.

In a seventh set of example process flows, a physical or chemical deposition process, such as a physical vapor deposition process, may be used to form a part made from a stainless steel, titanium, gold or other metal material. In each of the following example process flows, the part may be polished and/or blasted before performing the operations. In one example process flow, a deposition process is used to form a geometric element of a feature. A laser-based engraving process may then be used to form another geometric element and then the part may be laser colored using a laser-based coloring process. In an alternative example process flow, a deposition process is used to form a geometric element and then the part may be laser colored using a laser-based coloring process. In another alternative example process flow, a laser-based engraving process may be used to form a geometric element before using a deposition process to form another geometric element. In another alternative example process flow, a laser-based engraving process may be used to form a geometric element before using a laser-based coloring process to form a color element and then a deposition process to form another geometric element. In another alternative example process flow, a laser-based engraving process may be used to form a geometric element before using a deposition process to form another geometric element and then a laser-based coloring process to form a color element.

3. Example System for Performing Laser-Based Processes

Figure 14:
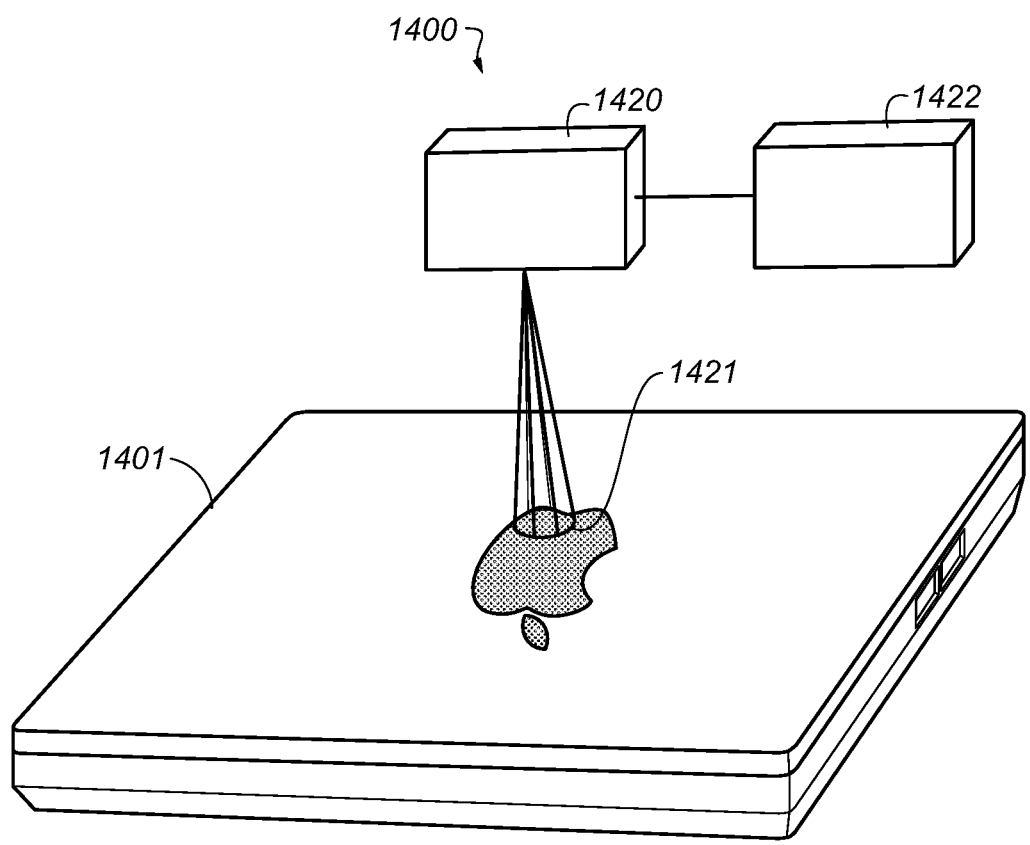
FIG. 14 depicts an example laser system for performing laser-based processes.

FIG. 14 depicts an example system for performing one or more of the laser-based processes described in the embodiments above. In particular, FIG. 14 depicts a simplified version of a system 1400 that includes a laser 1420 for forming a feature or pattern of features on the surface of a part 1401. More specifically, the laser 1420 may be configured to produce one or more elements (e.g., geometric, color, finish) of a feature using a laser scanned over the scan area 1421.

To produce geometric elements of a feature, the laser 1420 may be configured to ablate, vaporize, melt or otherwise remove material from the surface to form a three-dimensional surface or groove in the part. In some embodiments, the laser 1420 may include a nanosecond, picosecond, or femtosecond laser that can be used to form the individual texture features. As one non-limiting example, the laser 1420 may be configured to have a focus of approximately 20-30 microns, a pulse width of 10 nanoseconds or less, and a frequency of about 100 kHz or greater. In some cases a laser having approximately a 1 micron wavelength is used. For example, a wavelength of 1064, 1030, of 1070 nanometers may be used depending on the laser configuration. The laser 1420 may be configured vary the pulse width (for example, between 5 and 20 nanoseconds, or more or less), repetition rate, spot or focus size and/or shape, the overlap and/or pattern formed through successive passes of the laser (one example of which may be a hatching pattern used to form raised texture features or larger texture features), the scan speed of the laser (which may be 1000 mm/sec or greater, and the laser frequency (which may be, as mentioned, from about 100 kHz or greater).

The laser 1420 may also be configured to produce one or more color elements of a feature. In some cases, the laser 1420 may be configured to facilitate the formation of an oxide on the part that may result in a dark or black-marked region. In some cases, the laser 1420 may be configured to focus or direct a laser beam below an anodized or top layer to form an oxide below the surface of the part. In some cases, the laser 1420 may be configured to produce the black-marked or white-marked regions described with respect to some embodiments described above. In some embodiments, the laser 1420 may include an infrared wavelength laser, including, for example a picosecond pulsewidth infrared laser or nanosecond pulsewidth infrared laser. In one example, the laser 1420 includes a 6 Watt infrared wavelength picosecond pulsewidth laser at 1000 KHz with a scan speed of 50 millimeters per second. In another alternative example, the laser 1420 includes a laser having a 10 Watt infrared wavelength nanosecond pulsewidth laser at 40 KHz with a scan speed of 20 millimeters per second.

The laser 1420 may also be configured to produce one or more finish elements of or associated with a feature. For example, the laser 1420 may be configure to ablate or melt light-diffusing surface features in order to produce a surface having the desired specular properties or characteristics. In one example, the laser 1420 is configured to produce laser light having a wavelength of approximately 1064 nanometers, a laser pulse duration of approximately 30 nanoseconds at approximately 7 Watts, which may be sufficiently long for thermally melting light scattering surface features. In another example, the laser 1420 may be configured to produce a pulse duration of approximately 200 nanoseconds at approximately 9 Watts; a repetition rate of approximately 500 kHz; and a scan rate of approximately 1000 millimeters per second at a scan line pitch of approximately 5 microns. More generally, the laser 1420 may be configured to perform a laser-melt polishing process using laser pulses having a pulse width within a range from approximately 20 nanoseconds to approximately a microsecond or more.

In some cases, the laser 1420 may be configured to produce element of one or more features over a scan area 1421. The laser beam may be directed or steered over the scan area 1421 using, for example, one or more movable mirrors and other optical elements. In one example, the laser 1420 includes a pair of movable mirrors that are positioned using a pair of servo-controlled galvanometers. In some cases, the laser 1420 is configured to provide a raster scan over the scan area 1421 to heat, melt, ablate, or otherwise affect the surface of the part 1401 to produce one or more elements of a feature. The part 1401 and/or laser 1420 may be moved to form features over a larger area or on different surfaces of the part 1401.

As shown in FIG. 14, a computer controller 1422 may be used to coordinate the scanning motion of the servo-controlled galvanometer mirrors with laser pulses provided by the laser. In some embodiments, the computer controller 1422 includes a computer processor for executing computer-readable instructions that may be stored on a non-transitory computer-readable media, such as RAM, ROM, EPROM, magnetic media, solid state media, or other form of computer data storage. The computer controller 1422 may be configurable to perform, for example, one or more operations described above with respect to process 1300 of FIG. 13.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality or features may be separated or combined differently in various embodiments of the disclosure or described with different terminology. These and other variations, modifications, additions, and improvements may fall within the scope of the disclosure as defined in the claims that follow.

We claim:

1. An electronic watch comprising:

a housing; and an input dial that is rotatable, about a rotation axis of the input dial, relative to the housing and defines:

an axial end surface defining a flat region and formed at least partially of aluminum;

a peripheral surface formed at least partially of aluminum;

a curved surface formed at least partially of aluminum and extending along a first curved path between the axial end surface and the peripheral surface, the first curved path in a first radial plane of the input dial; and a radial array of rectangular grooves along the curved surface, at least one groove of the radial array of rectangular grooves defining a bottom surface extending along a second curved path in a second radial plane of the input dial.

2. The electronic watch of claim 1, further comprising:

a display coupled to the housing;

a transparent cover at least partially covering the display and defining an input surface of the electronic watch; and a touch sensing system configured to detect touch events applied to the input surface of the electronic watch.

3. The electronic watch of claim 1, wherein the curved surface defines a convex shape extending between the axial end surface and the peripheral surface.

4. The electronic watch of claim 1, wherein the curved surface defines a concave shape extending between the axial end surface and the peripheral surface.

5. The electronic watch of claim 1, wherein the input dial comprises a ceramic material.

6. An electronic watch comprising:
a housing; and
an aluminum dial that is rotatable relative to the housing and defining:
- a flat end surface at an axial end of the aluminum dial;
- a round peripheral surface extending about a circumference of the aluminum dial;
- a convex curved surface extending from the flat end surface to the round peripheral surface along a first curved path, the first curved path in a first radial plane of the aluminum dial; and
- a radial array of grooves along at least the convex curved surface, a groove of the radial array of grooves defining a bottom surface having a portion extending along a second curved path in a second radial plane of the aluminum dial.

7. The electronic watch of claim 6, wherein the groove of the radial array of grooves further defines two side surfaces extending from the bottom surface.

8. The electronic watch of claim 7, wherein the two side surfaces extend perpendicularly from the bottom surface.

9. The electronic watch of claim 7, wherein the two side surfaces extend from the bottom surface at a non-perpendicular angle.

10. The electronic watch of claim 7, wherein the aluminum dial further defines chamfered edges where the two side surfaces meet the convex curved surface.

11. The electronic watch of claim 6, further defining curved transition regions joining the bottom surface to the two side surfaces.

12. The electronic watch of claim 6, wherein the housing comprises aluminum.

13. The electronic watch of claim 6, further comprising:
a display coupled to the housing;
a transparent cover at least partially covering the display and defining an input surface of the electronic watch; and
a touch sensing system configured to detect touch events applied to the input surface of the electronic watch.

14. The electronic watch of claim 13, wherein the aluminum dial is configured to modify graphical content being displayed on the display.

15. An electronic watch comprising:
a housing; and
an aluminum input dial that is rotatable, about a rotation axis, relative to the housing and defines:
- an axial end surface on the aluminum input dial and having a first non-patterned region, the first non-patterned region being flat;
- a peripheral surface on the aluminum input dial and having a second non-patterned region;
- a curved surface extending along a first curved path between the axial end surface and the peripheral surface, the first curved path in a first radial plane of the aluminum input dial; and
- a radial array of grooves along the curved surface, a groove of the radial array of grooves:
  - defining a bottom surface extending along a second curved path in a second radial plane of the aluminum input dial; and
  - extending from the first non-patterned region to the second non-patterned region.

16. The electronic watch of claim 15, wherein the groove further defines two side surfaces extending perpendicularly from the bottom surface.

17. The electronic watch of claim 15, wherein the curved surface is concave.

18. The electronic watch of claim 15, wherein the curved surface is convex.

19. The electronic watch of claim 15, wherein the second curved path and the rotation axis are coplanar.

20. The electronic watch of claim 15, wherein:
the electronic watch further comprises:
- a display coupled to the housing;
- a transparent cover at least partially covering the display and defining an input surface of the electronic watch; and
- a touch sensing system configured to detect touch events applied to the input surface of the electronic watch; and the aluminum input dial is configured to modify graphical content being displayed on the display.

* * * * *